US010271084B2

(12) United States Patent
Van Os et al.

(10) Patent No.: US 10,271,084 B2
(45) Date of Patent: Apr. 23, 2019

(54) VIDEO RECORDING AND REPLAY

(71) Applicant: Apple Inc., Cupertino, CA (US)

(72) Inventors: Marcel Van Os, San Francisco, CA (US); Donald W. Pitschel, San Francisco, CA (US); Imran Chaudhri, San Francisco, CA (US); Nathan Taylor, Scotts Valley, CA (US); Kellie Albert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/863,616

(22) Filed: Sep. 24, 2015

(65) Prior Publication Data

US 2016/0360256 A1 Dec. 8, 2016

Related U.S. Application Data

(60) Provisional application No. 62/172,173, filed on Jun. 7, 2015.

(51) Int. Cl.
*H04N 21/4147* (2011.01)
*H04N 21/41* (2011.01)
(Continued)

(52) U.S. Cl.
CPC ....... *H04N 21/41407* (2013.01); *A63F 13/00* (2013.01); *A63F 13/213* (2014.09); *A63F 13/215* (2014.09); *A63F 13/497* (2014.09); *A63F 13/533* (2014.09); *G11B 27/031* (2013.01); *G11B 27/32* (2013.01); *H04N 5/76* (2013.01); *H04N 5/765* (2013.01);
(Continued)

(58) Field of Classification Search
CPC .................. H04N 21/4147; H04N 21/4126
See application file for complete search history.

(56) References Cited

U.S. PATENT DOCUMENTS

2001/0039552 A1* 11/2001 Killi ................... G09B 5/02
715/234
2010/0167809 A1* 7/2010 Perlman ............... A63F 13/12
463/24
(Continued)

FOREIGN PATENT DOCUMENTS

CN 103945275 A 7/2014
CN 104159177 A 11/2014
(Continued)

OTHER PUBLICATIONS

AZ Screen Recorder, AZ Screen Recorder (video1), Jan. 15, 2015, https://www.youtube.com/watch?v=llc9nKoL9JY.*
(Continued)

*Primary Examiner* — Brian T Pendleton
*Assistant Examiner* — Frank Johnson
(74) *Attorney, Agent, or Firm* — Dentons US LLP

(57) ABSTRACT

The present disclosure generally relates to user interfaces for recording and playing audio and video. In one example, a first application requests a second application to initiate recording one or more data streams of the first application. The second application displays a confirmation affordance. In response to detecting activation of the confirmation affordance, the second application initiates a recording of at least one of the data stream of the first application.

57 Claims, 26 Drawing Sheets

(51) Int. Cl.

| | |
|---|---|
| *A63F 13/86* | (2014.01) |
| *H04N 21/414* | (2011.01) |
| *H04N 21/4223* | (2011.01) |
| *H04N 21/433* | (2011.01) |
| *H04N 21/443* | (2011.01) |
| *H04N 21/472* | (2011.01) |
| *H04N 21/478* | (2011.01) |
| *A63F 13/00* | (2014.01) |
| *G11B 27/031* | (2006.01) |
| *G11B 27/32* | (2006.01) |
| *H04N 5/76* | (2006.01) |
| *H04N 5/765* | (2006.01) |
| *A63F 13/213* | (2014.01) |
| *A63F 13/497* | (2014.01) |
| *A63F 13/533* | (2014.01) |
| *A63F 13/215* | (2014.01) |
| *A63F 13/537* | (2014.01) |

(52) U.S. Cl.
CPC ..... *H04N 21/4223* (2013.01); *H04N 21/4334* (2013.01); *H04N 21/443* (2013.01); *H04N 21/4781* (2013.01); *H04N 21/47217* (2013.01); *A63F 13/537* (2014.09)

(56) References Cited

U.S. PATENT DOCUMENTS

| | | | | |
|---|---|---|---|---|
| 2011/0252381 | A1 | 10/2011 | Chaudhri | |
| 2011/0262103 | A1 | 10/2011 | Ramachandran et al. | |
| 2012/0293619 | A1 | 11/2012 | Newton et al. | |
| 2012/0324359 | A1* | 12/2012 | Lee | G06F 8/38 715/733 |
| 2013/0318476 | A1* | 11/2013 | Sauve | G06F 3/0484 715/835 |
| 2014/0073298 | A1* | 3/2014 | Rossmann | H04W 4/00 455/414.2 |
| 2014/0179428 | A1 | 6/2014 | Miura et al. | |
| 2014/0205259 | A1* | 7/2014 | Kamity | H04N 5/76 386/201 |
| 2014/0343703 | A1* | 11/2014 | Topchy | G06F 17/30743 700/94 |
| 2014/0359766 | A1* | 12/2014 | Klein | G06F 21/554 726/23 |
| 2015/0087414 | A1* | 3/2015 | Chen | A63F 13/355 3/355 |
| 2015/0135108 | A1 | 5/2015 | Pope et al. | |
| 2015/0251093 | A1* | 9/2015 | Trombetta | A63F 13/49 463/24 |
| 2015/0381896 | A1* | 12/2015 | Park | H04N 5/23293 386/224 |

FOREIGN PATENT DOCUMENTS

| | | |
|---|---|---|
| CN | 104461894 A | 3/2015 |
| WO | 2015/027912 A1 | 3/2015 |

OTHER PUBLICATIONS

AZ Screen Recorder, Full features—AZ Screen Recorder (video2), Feb. 13, 2015, https://youtube.com/watch?v=L6tAMO_Bu34.*

AZ Screen Recorder, GIF converter—AZ Screen Recorder (video3), May 29, 2015, https://youtube.com/watch?v=gA19pr1QOFM.*

International Preliminary Report on Patentability received for PCT Patent Application No. PCT/US2016/033946, dated Dec. 21, 2017, 11 pages.

International Search Report and Written Opinion received PCT Patent Application No. PCT/US2016/033946, dated Aug. 2, 2016, 2 pages.

Invitation to Pay Additional Fee received for PCT Patent Application No. PCT/US2016/033946, dated Aug. 2, 2016, 2 pages.

Extended European Search Report received for European Patent Application No. 16808015.8, dated May 2, 2018, 13 pages.

Iskandar, Edwin, "Going Social with ReplayKit and Game Center What's New in Social Gaming", Available online at: http://devstreaming.apple.com/videos/wwdc/2015/6053hq2fz0ebo0lm/605/605_going_social_with_replaykit_and_game_center.pdf?dl=1, Jun. 8, 2015, 103 pages.

Russel, Kyle, "Kamcord Launches on Android With a Streamlined Video Capture Experience", Available Online at: https://techcrunch.com/2015/06/02/kamcord-launches-on-android-with-a-streamlined-video-capture-experience/, Jun. 2, 2015, 2 pages.

Russel, Kyle, "Kamcord Now Lets Users Upload Edited Videos of Their Mobile Gaming Sessions", Available online at: https://techcrunch.com/2015/03/31/kamcord-now-lets-users-upload-edited-videos-of-their-mobile-gaming-sessions/, Mar. 31, 2015, 2 pages.

Wan, Adrian, "Game Recording Service Kamcord 'Investing Heavily as China's Mobile Gaming Market Overtakes US", Available online at: http://www.scmp.com/tech/apps-gaming/article/1814442/game-recording-service-kamcord-investing-heavily-chinas-mobile, Jun. 4, 2015, 4 pages.

Office Action received for Chinese Patent Application No. 201680031372.8, dated Dec. 6, 2018, 15 pages (6 Pages of English Translation and 9 pages of Official Copy).

* cited by examiner

VIDEO RECORDING AND REPLAY

CROSS-REFERENCE TO RELATED APPLICATIONS

This application claims priority from U.S. Provisional Ser. No. 62/172,173, entitled "VIDEO RECORDING AND REPLAY," filed Jun. 7, 2015, which is hereby incorporated by reference in its entirety for all purposes.

FIELD

The present disclosure relates generally to computer user interfaces, and more specifically to techniques for recording and playing audio and video.

BACKGROUND

The use of electronic devices for game play, productivity, and multimedia has increased significantly in recent years. Electronic devices can also be used to record audio and video using a microphone and a camera sensor. Electronic devices can also play back the recorded audio and video.

BRIEF SUMMARY

Some techniques for recording and playing audio and video using electronic devices, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, the present disclosure provides for electronic devices with faster, more efficient methods and interfaces for recording and playing audio and video. Such methods and interfaces optionally complement or replace other methods for recording and playing video. Such methods and interfaces reduce the cognitive burden on a user and produce a more efficient human-machine interface. For battery-operated computing devices, such methods and interfaces conserve power and increase the time between battery charges. Such methods and interfaces also reduce processing power, reduce memory usage, reduce battery usage by a display, reduce receiving unnecessary, extraneous, or repetitive inputs.

In some embodiments, a method is described. The method comprises: at an electronic device including a display: displaying, on the display, a user interface for a first application; detecting a record request from the first application to a second application, wherein the record request corresponds to a request for the second application to initiate recording of one or more data streams that include at least one data stream generated by the first application; in response to detecting the record request from the first application, displaying, on the display, a user interface for the second application, the user interface for the second application including a confirmation affordance; detecting activation of the confirmation affordance; in response to detecting activation of the confirmation affordance, initiating a recording of at least one data stream of the one or more data streams; detecting a stop request requesting stoppage of recording of the at least one data stream of the one or more data streams; and in response to detecting the stop request, stopping recording of the at least one data stream of the one or more data streams.

In some embodiments, a method is described. The method comprises: at an electronic device including a display: concurrently displaying, on the display, a user interface for a first application and a user interface for a second application, wherein at least a portion of the user interface for the first application is overlaid by at least a portion of the user interface for the second application and wherein the user interface for the second application includes a record affordance; detecting activation of the record affordance; in response to detecting activation of the record affordance, initiating a recording of at least one data stream of one or more data streams; displaying, on the user interface for the second application, a stop affordance; detecting activation of the stop affordance; and in response to detecting activation of the stop affordance, stopping recording of the at least one data stream of the one or more data streams.

In some embodiments, a non-transitory computer-readable storage medium is described. The non-transitory computer-readable storage medium comprises one or more programs for execution by one or more processors of an electronic device with a display, the one or more programs including instructions which, when executed by the one or more processors, cause the electronic device to: display, on the display, a user interface for a first application; detect a record request from the first application to a second application, wherein the record request corresponds to a request for the second application to initiate recording of one or more data streams that include at least one data stream generated by the first application; in response to detecting the record request from the first application, display, on the display, a user interface for the second application, the user interface for the second application including a confirmation affordance; detect activation of the confirmation affordance; in response to detecting activation of the confirmation affordance, initiate a recording of at least one data stream of the one or more data streams; detect a stop request requesting stoppage of recording of the at least one data stream of the one or more data streams; and in response to detecting the stop request, stop recording of the at least one data stream of the one or more data streams.

In some embodiments, an electronic device is described. The electronic device comprises: a display; one or more processors; memory; and one or more programs stored in memory, including instructions which, when executed by the one or more processors, cause the electronic device to: display, on the display, a user interface for a first application; detect a record request from the first application to a second application, wherein the record request corresponds to a request for the second application to initiate recording of one or more data streams that include at least one data stream generated by the first application; in response to detecting the record request from the first application, display, on the display, a user interface for the second application, the user interface for the second application including a confirmation affordance; detect activation of the confirmation affordance; in response to detecting activation of the confirmation affordance, initiate a recording of at least one data stream of the one or more data streams; detect a stop request requesting stoppage of recording of the at least one data stream of the one or more data streams; and in response to detecting the stop request, stop recording of the at least one data stream of the one or more data streams.

In some embodiments, an electronic device is described. The electronic device comprises: a display; means for displaying, on the display, a user interface for a first application; means for detecting a record request from the first application to a second application, wherein the record request corresponds to a request for the second application to initiate recording of one or more data streams that include at least one data stream generated by the first application; means, responsive to detecting the record request from the first application, for displaying, on the display, a user interface for the second application, the user interface for the second application including a confirmation affordance; means for detecting activation of the confirmation affordance; means, responsive to detecting activation of the confirmation affordance, for initiating a recording of at least one data stream of the one or more data streams; means for detecting a stop request requesting stoppage of recording of the at least one data stream of the one or more data streams; and means, responsive to detecting the stop request, for stopping recording of the at least one data stream of the one or more data streams.

In some embodiments, a non-transitory computer-readable storage medium is described. The non-transitory computer-readable storage medium comprises one or more programs for execution by one or more processors of an electronic device with a display, the one or more programs including instructions which, when executed by the one or more processors, cause the electronic device to: concurrently display, on the display, a user interface for a first application and a user interface for a second application, wherein at least a portion of the user interface for the first application is overlaid by at least a portion of the user interface for the second application and wherein the user interface for the second application includes a record affordance; detect activation of the record affordance; in response to detecting activation of the record affordance, initiate a recording of at least one data stream of one or more data streams; display, on the user interface for the second application, a stop affordance; detect activation of the stop affordance; and in response to detecting activation of the stop affordance, stop recording of the at least one data stream of the one or more data streams.

In some embodiments, an electronic device is described. The electronic device comprises: a display; one or more processors; memory; and one or more programs stored in memory, including instructions which, when executed by the one or more processors, cause the electronic device to: concurrently display, on the display, a user interface for a first application and a user interface for a second application, wherein at least a portion of the user interface for the first application is overlaid by at least a portion of the user interface for the second application and wherein the user interface for the second application includes a record affordance; detect activation of the record affordance; in response to detecting activation of the record affordance, initiate a recording of at least one data stream of one or more data streams; display, on the user interface for the second application, a stop affordance; detect activation of the stop affordance; and in response to detecting activation of the stop affordance, stop recording of the at least one data stream of the one or more data streams.

In some embodiments, an electronic device is described. The electronic device comprises: a display; means for concurrently displaying, on the display, a user interface for a first application and a user interface for a second application, wherein at least a portion of the user interface for the first application is overlaid by at least a portion of the user interface for the second application and wherein the user interface for the second application includes a record affordance; means for detecting activation of the record affordance; means, responsive to detecting activation of the record affordance, for initiating a recording of at least one data stream of one or more data streams; means for displaying, on the user interface for the second application, a stop affordance; means for detecting activation of the stop affordance; and in response to detecting activation of the stop affordance, means for stopping recording of the at least one data stream of the one or more data streams.

In some embodiments, an electronic device is described. The electronic device comprises: a display unit; a processing unit coupled to the display unit, the processing unit configured to: enable display, on the display unit, a user interface for a first application; detect a record request from the first application to a second application, wherein the record request corresponds to a request for the second application to initiate recording of one or more data streams that include at least one data stream generated by the first application; in response to detecting the record request from the first application, enable display, on the display unit, a user interface for the second application, the user interface for the second application including a confirmation affordance; detect activation of the confirmation affordance; in response to detecting activation of the confirmation affordance, initiate a recording of at least one data stream of the one or more data streams; detect a stop request requesting stoppage of recording of the at least one data stream of the one or more data streams; and in response to detecting the stop request, stop recording of the at least one data stream of the one or more data streams.

In some embodiments, an electronic device is described. The electronic device comprises: a display unit; a processing unit coupled to the display unit, the processing unit configured to: concurrently enable display of, on the display unit, a user interface for a first application and a user interface for a second application, wherein at least a portion of the user interface for the first application is overlaid by at least a portion of the user interface for the second application and wherein the user interface for the second application includes a record affordance; detect activation of the record affordance; in response to detecting activation of the record affordance, initiate a recording of at least one data stream of one or more data streams; enable display of, on the user interface for the second application, a stop affordance; detect activation of the stop affordance; and in response to detecting activation of the stop affordance, stop recording of the at least one data stream of the one or more data streams.

In some embodiments, a transitory computer-readable storage medium is described. The transitory computer-readable storage medium comprises one or more programs for execution by one or more processors of an electronic device with a display, the one or more programs including instructions which, when executed by the one or more processors, cause the electronic device to: display, on the display, a user interface for a first application; detect a record request from the first application to a second application, wherein the record request corresponds to a request for the second application to initiate recording of one or more data streams that include at least one data stream generated by the first application; in response to detecting the record request from the first application, display, on the display, a user interface for the second application, the user interface for the second application including a confirmation affordance; detect activation of the confirmation affordance; in response to detecting activation of the confirmation affordance, initiate a recording of at least one data stream of the one or more data streams; detect a stop request requesting stoppage of recording of the at least one data stream of the one or more data streams; and in response to detecting the stop request, stop recording of the at least one data stream of the one or more data streams.

In some embodiments, a transitory computer-readable storage medium is described. The transitory computer-readable storage medium comprises one or more programs for execution by one or more processors of an electronic device with a display, the one or more programs including instructions which, when executed by the one or more processors, cause the electronic device to: concurrently display, on the display, a user interface for a first application and a user interface for a second application, wherein at least a portion of the user interface for the first application is overlaid by at least a portion of the user interface for the second application and wherein the user interface for the second application includes a record affordance; detect activation of the record affordance; in response to detecting activation of the record affordance, initiate a recording of at least one data stream of one or more data streams; display, on the user interface for the second application, a stop affordance; detect activation of the stop affordance; and in response to detecting activation of the stop affordance, stop recording of the at least one data stream of the one or more data streams.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for recording and playing audio and video, thereby increasing the effectiveness, efficiency, and user satisfaction with such devices. Such methods and interfaces may complement or replace other methods for recording and playing audio and video.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
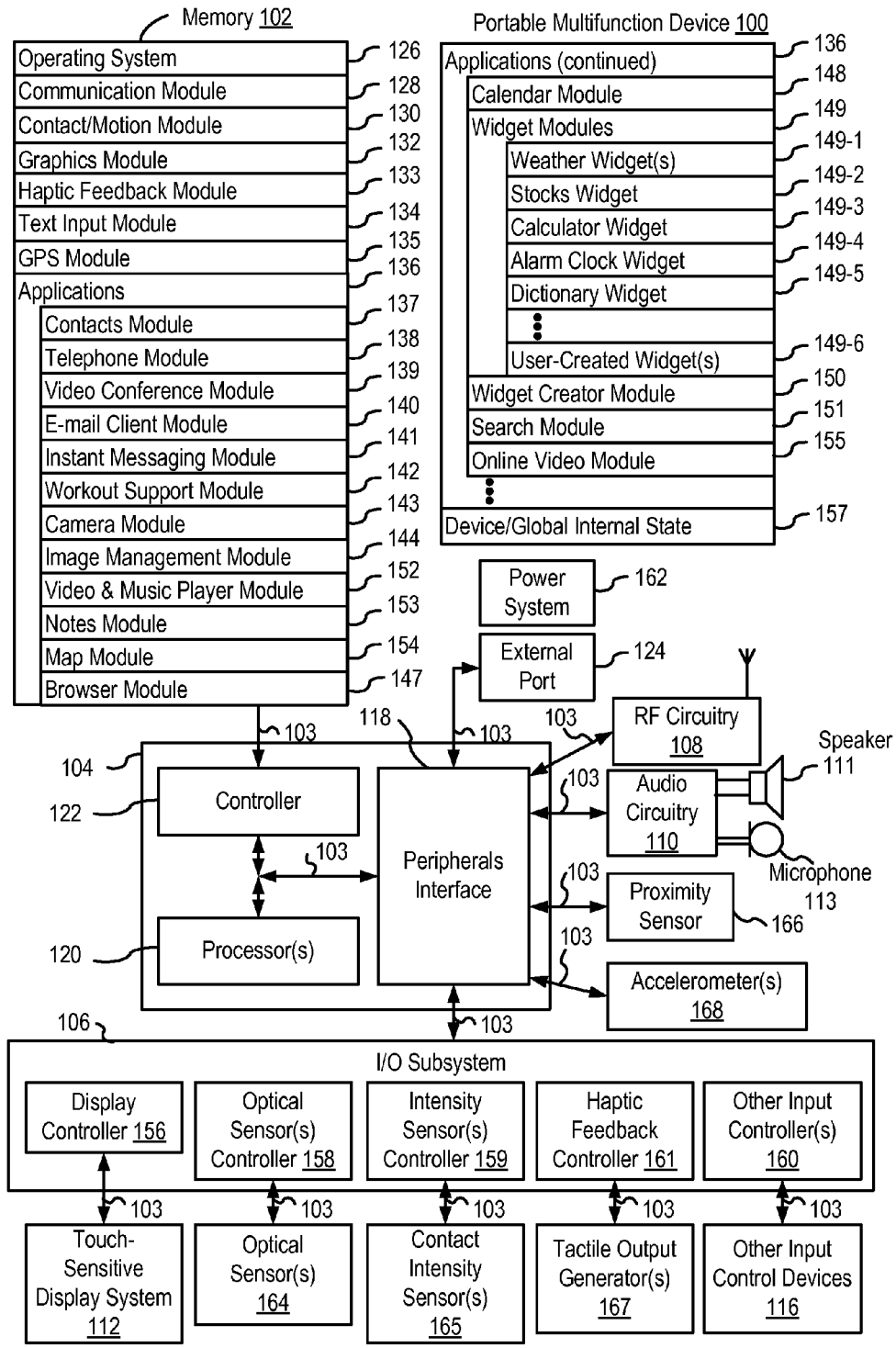
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for recording and playing audio and video. Such techniques can reduce the cognitive burden on a user who access event notifications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for recording and playing audio and video. FIGS. 6A-6E illustrate exemplary user interfaces for recording and playing audio and video. FIG. 7 is a flow diagram illustrating methods of recording and playing audio and video in accordance with some embodiments. The user interfaces in FIGS. 6A-6E are used to illustrate the processes described below, including the processes in FIG. 7. FIGS. 8A-8I illustrate exemplary user interfaces for recording and playing audio and video. FIG. 9 is a flow diagram illustrating methods of recording and playing audio and video in accordance with some embodiments. The user interfaces in FIGS. 8A-8I are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
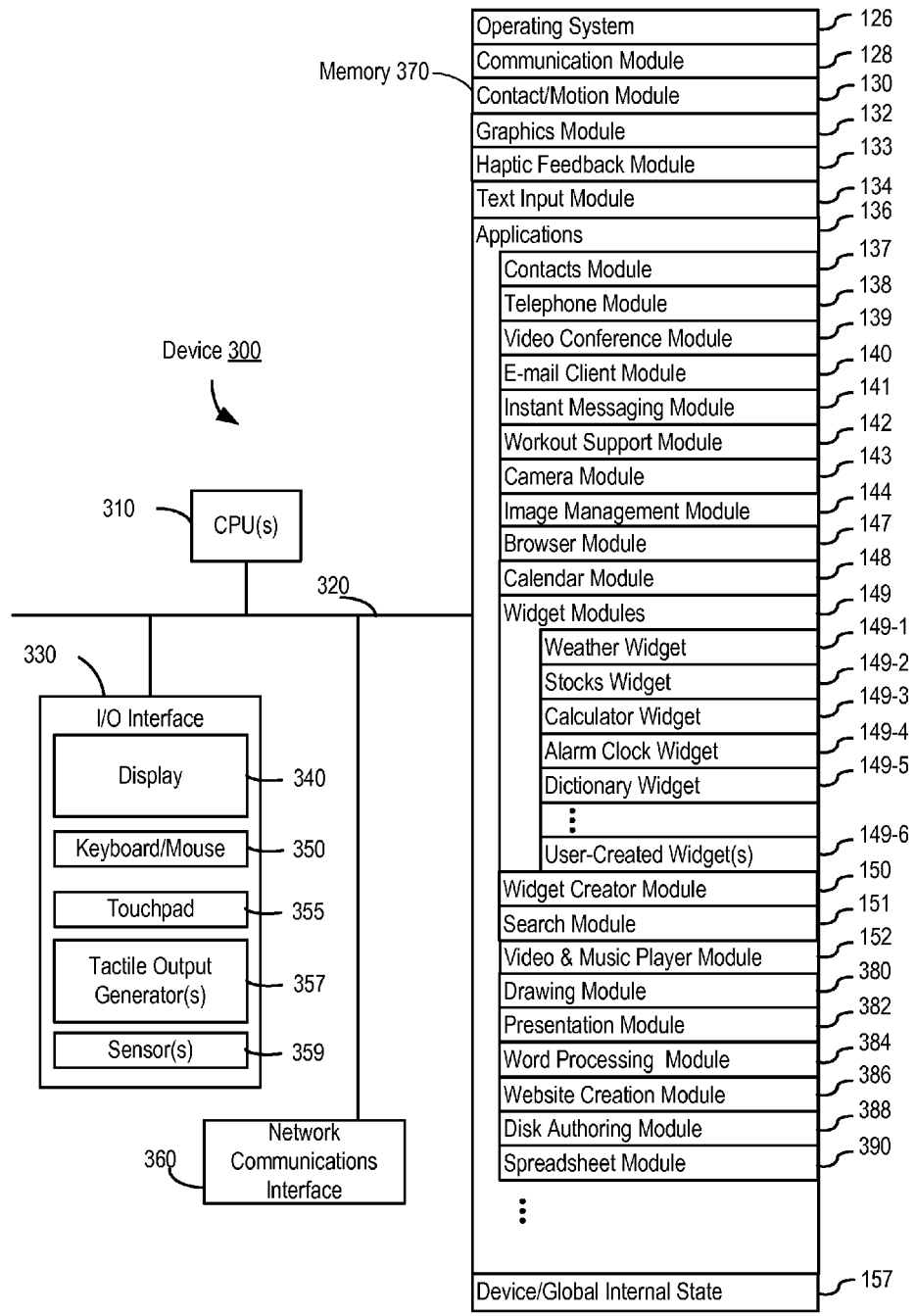
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
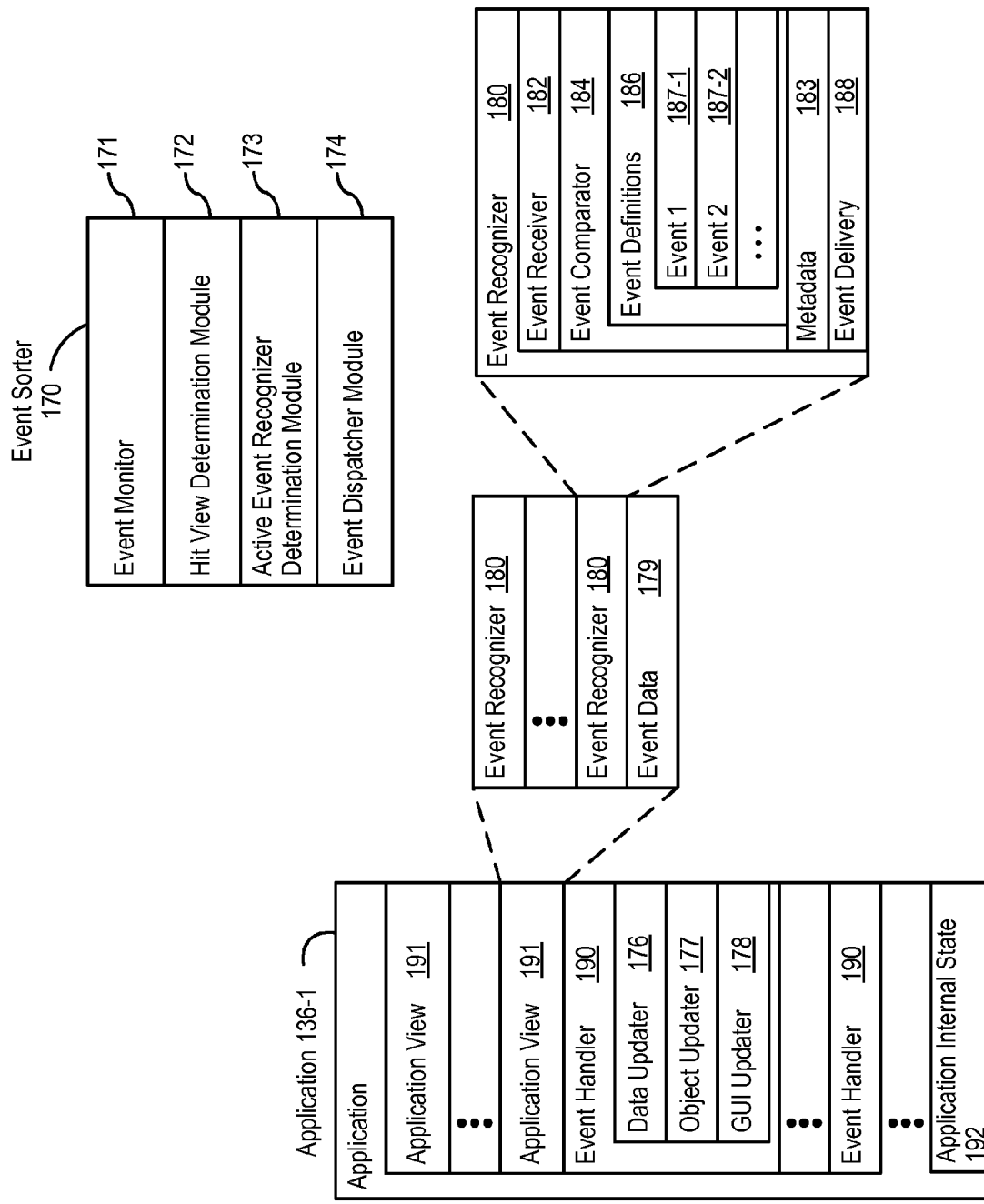
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
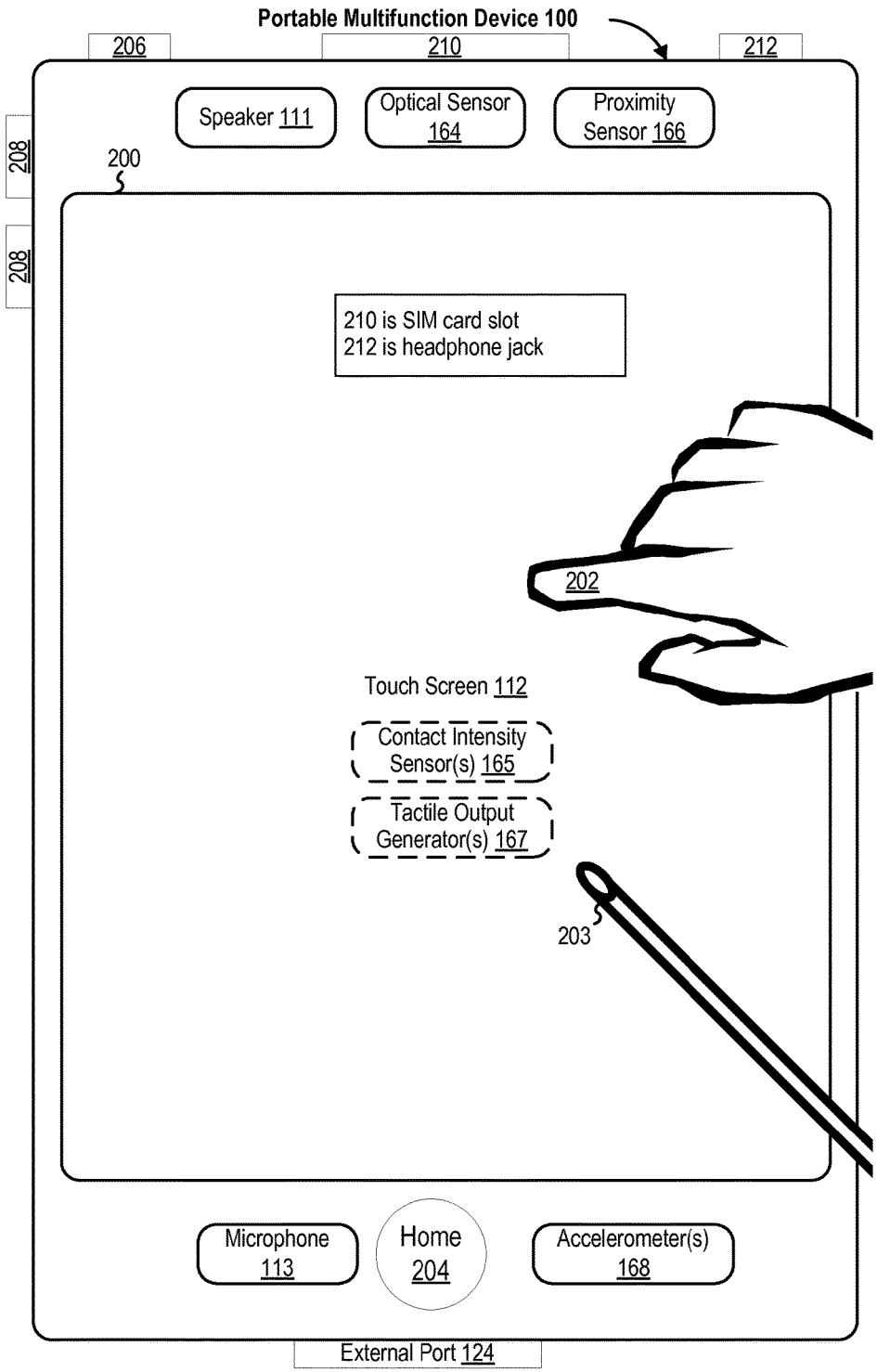
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
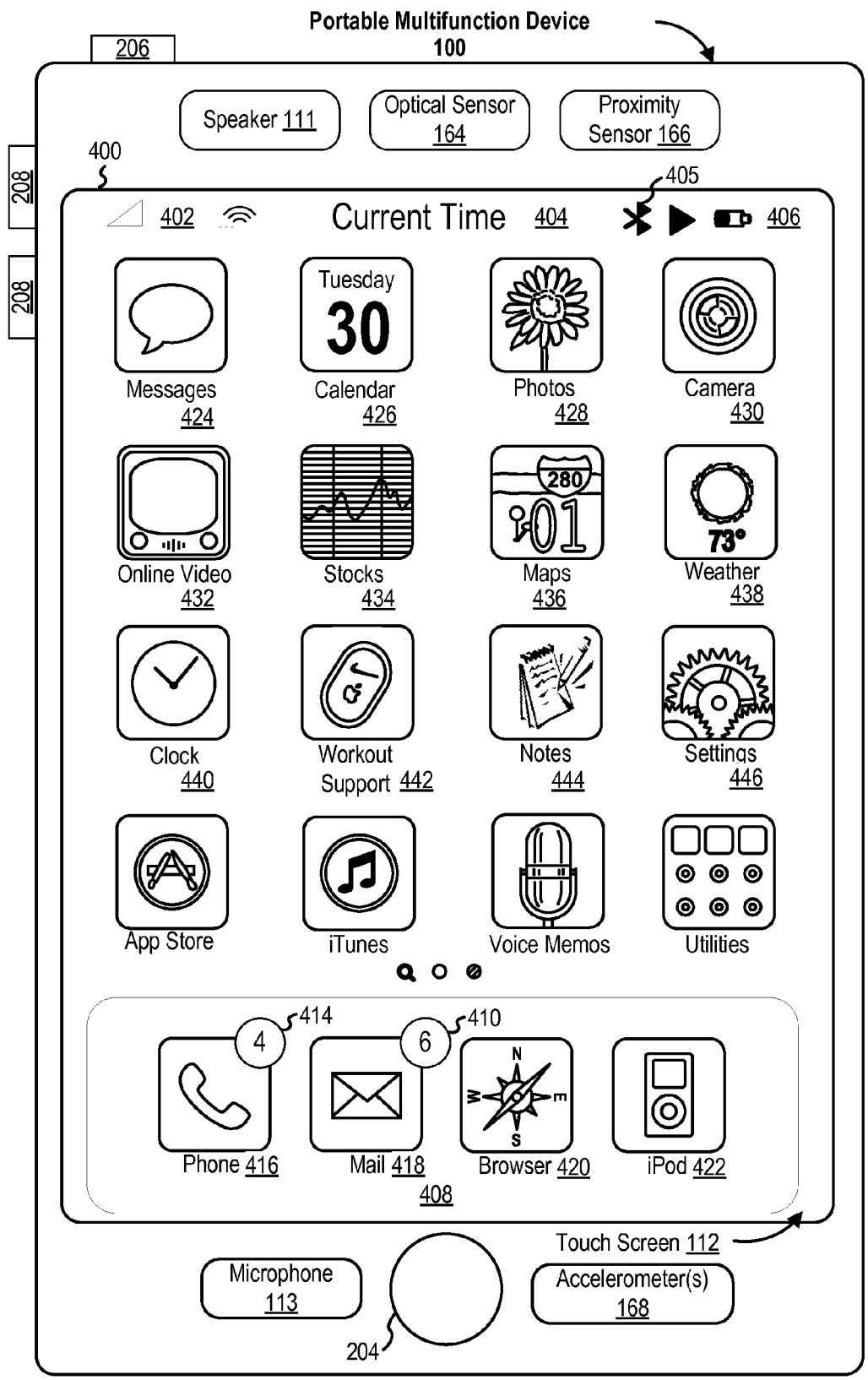
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
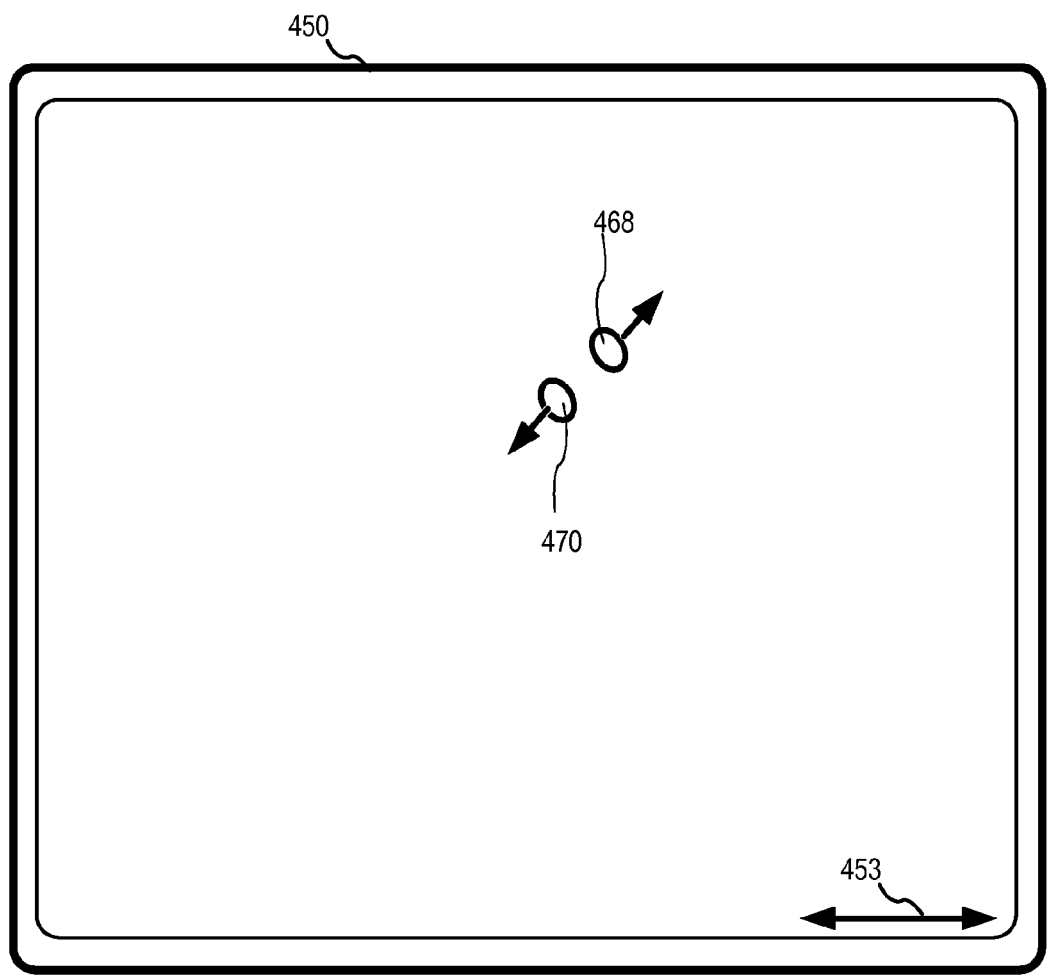
FIG. 4B illustrates an exemplary user interface for a multifunction device with a touch-sensitive surface that is separate from the display in accordance with some embodiments.
Figure 4B:
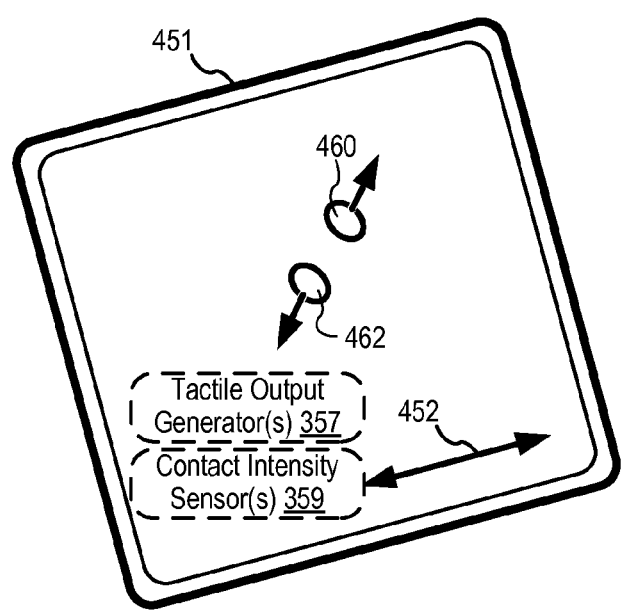

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
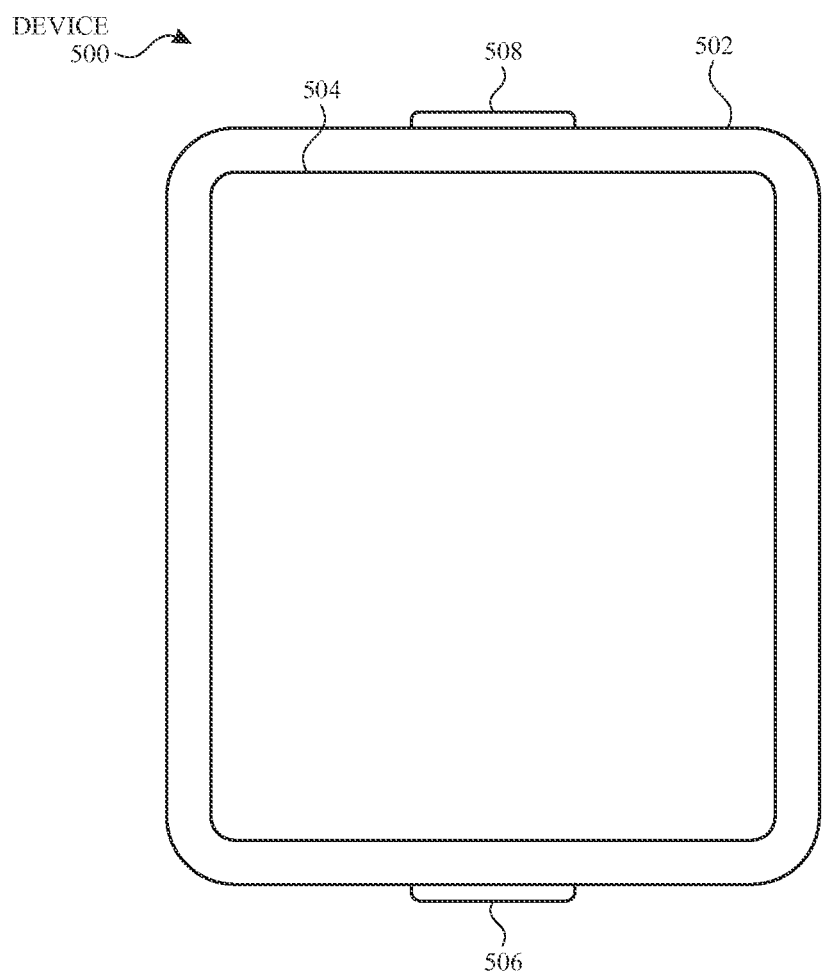
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
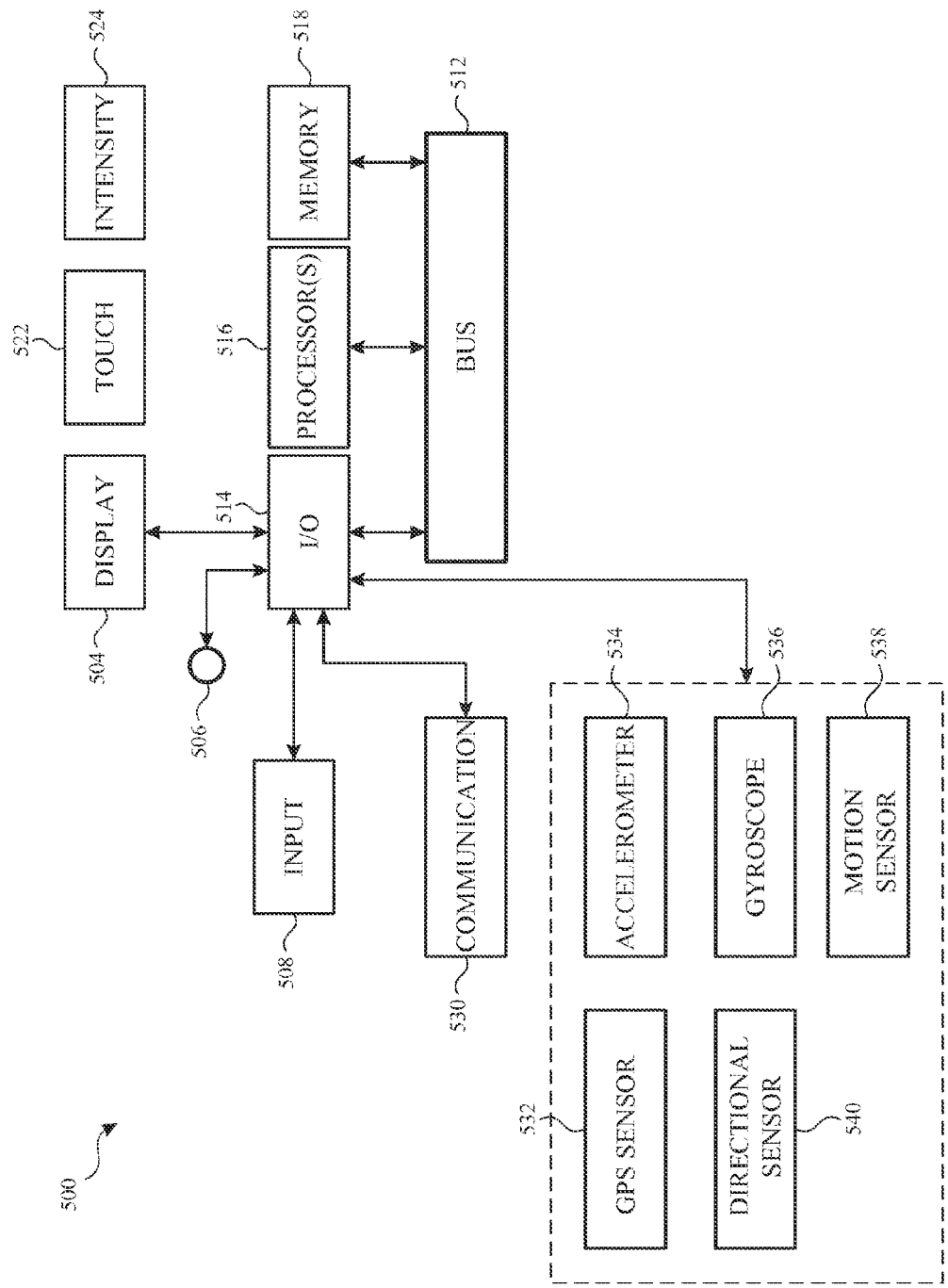
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 and 900. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are optionally implemented on an electronic device with a display, such as portable multifunction device 100, device 300, or device 500.

FIGS. 6A-6E illustrate exemplary user interfaces for recording data streams, in accordance with some embodiments. The user interfaces in these figures are used to illustrate the processes described below, including the processes in FIG. 7.

Figure 6A:
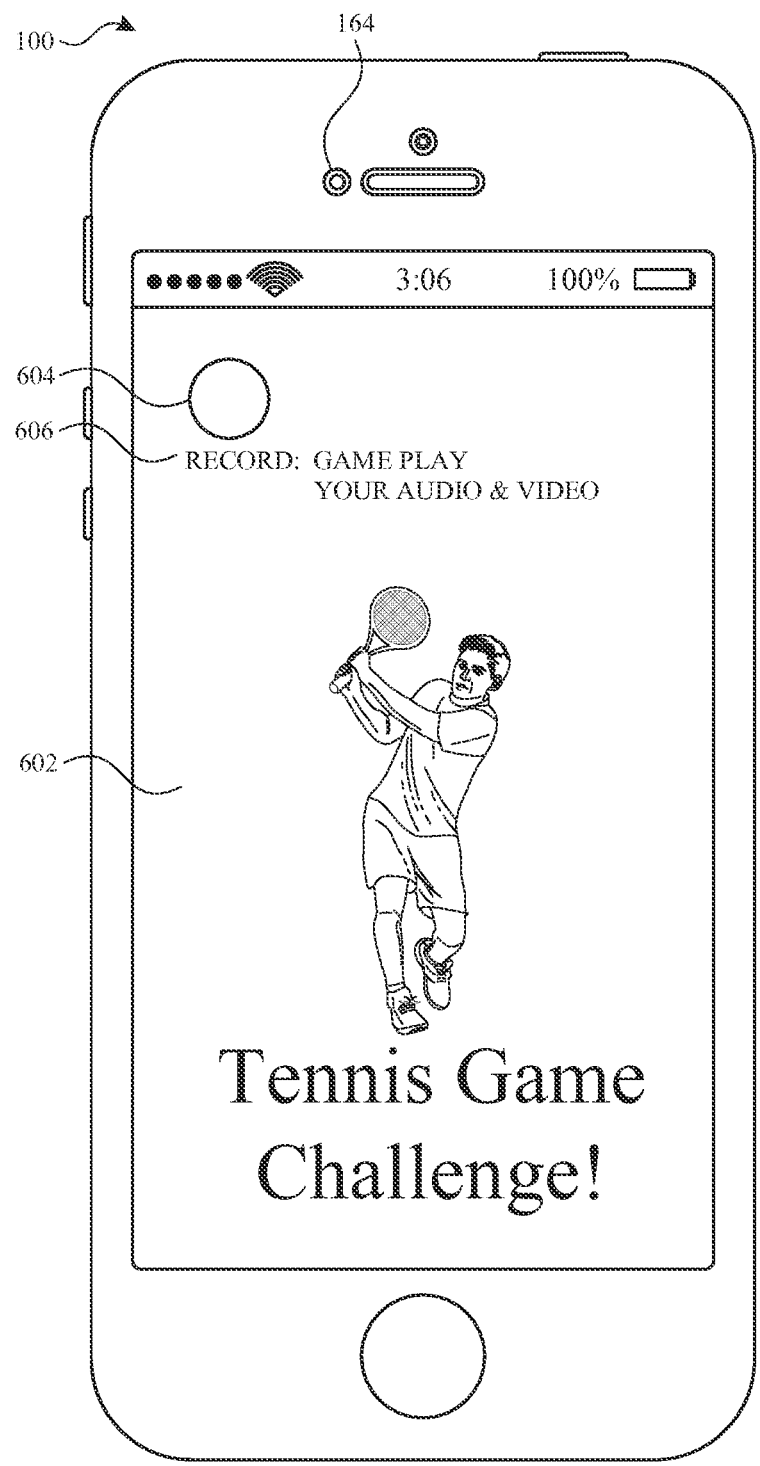
FIGS. 6A-6E illustrate exemplary user interfaces for recording and playing audio and video in accordance with some embodiments.
Figure 7:
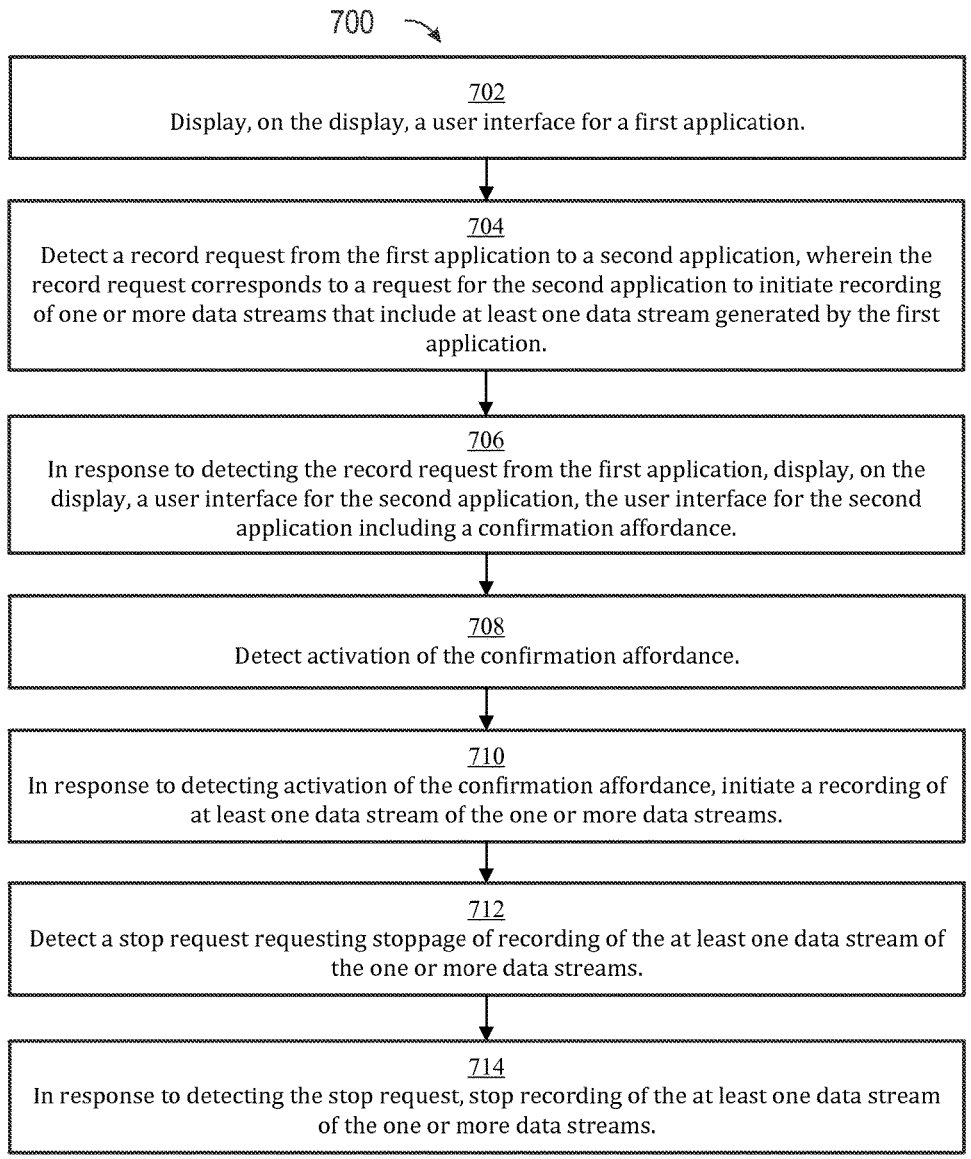
FIG. 7 is a flow diagram illustrating methods of recording and playing audio and video in accordance with some embodiments.

At FIG. 6A, the electronic device displays, on the display, a user interface (e.g., 602) for a first application (e.g., a game application; a workout application for an outdoor work out such as a run or bike ride or an indoor workout). In this example, the device displays a tennis game application. In some embodiments, for security reasons, the first application (e.g., the game application) is restricted from accessing or recording one or more types of data streams associated with user activity while using the device (e.g., the first application is prohibited from generating screen recordings and/or recording user activity via a camera or microphone of the device).

The electronic device detects a record request (e.g., via an API call based on activation of record affordance 604) from the first application (e.g., the game application) to a second application (e.g., an operating system of the electronic device or another application on the electronic device that has privileges to record data streams associated with user activity while using the device that the first application is prohibited from recording). The record request corresponds to a request for the second application to initiate recording of one or more data streams that include at least one data stream generated by the first application (or channels; such as an application video channel of the first application, an application audio channel of the first application, an audio input channel received at a microphone of the electronic device, a video input channel received at a camera sensor of the electronic device). In some examples, at least one of the data streams is associated with the first application (e.g., one of the data streams is a data stream of video or audio output by the first application).

Figure 6B:
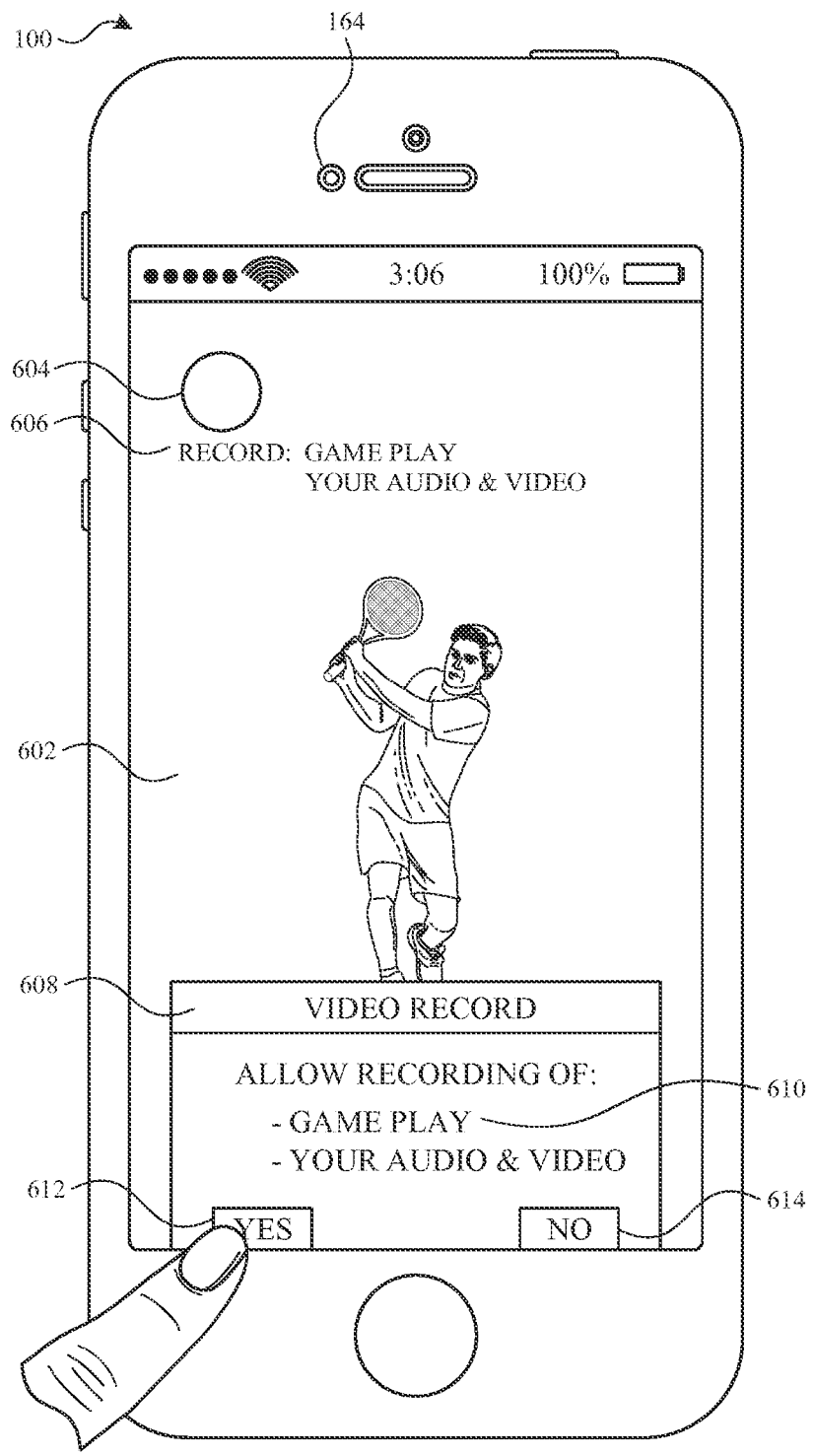

At FIG. 6B, in response to detecting the record request from the first application (e.g., to the second application), the electronic device displays, on the display, a user interface (608) for the second application, the user interface (608) for the second application including a confirmation affordance (612). For example, the device requests user confirmation that it is acceptable to allow the electronic device to record game play (e.g., audio/video data streams of the game), audio received at a microphone of the electronic device, and a video received at a camera sensor (e.g., 164) of the electronic device. In the example of FIG. 6B, prior to (and, optionally, concurrent with) detecting the record request, the electronic device displays an indication 606 of the one or more data streams to be requested for recording.

At FIG. 6B, the electronic device detects (e.g., by the second application) activation (e.g., by the user) of the confirmation affordance (612). In response to detecting activation of the confirmation affordance (e.g., 612), the electronic device initiates (e.g., by the second application) a recording of at least one data stream of the one or more data streams. Alternatively, if the device detects (e.g., by the second application) activation (e.g., by the user) of a decline affordance (614), the electronic device forgoes initiating the recording of at least one data stream of the one or more data streams. In the example of FIG. 6B, the electronic device concurrently displays an indication (610) of the one or more data streams to be requested for recording with the confirmation affordance (612).

Figure 6C:
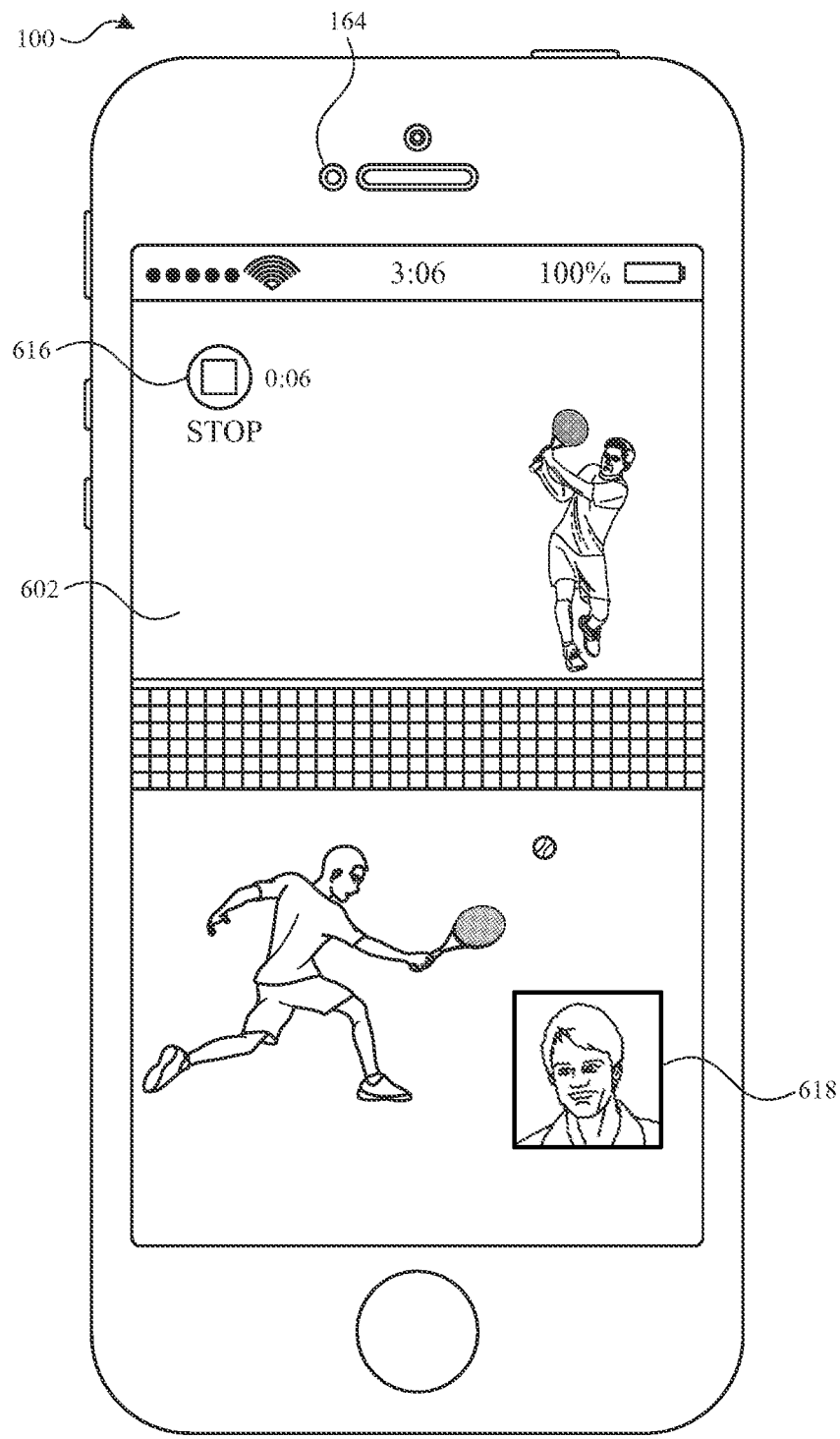

As illustrated in FIG. 6C, the first application (the game application) displays graphical elements and provides output audio. As described in more detail below, in FIG. 6C, the electronic device displays stop affordance 616 and picture-in-picture video 618 of the video received at the camera sensor of the device.

The electronic device detects a stop request (e.g., via an API call) requesting stoppage of recording (e.g., based on user activation of stop affordance 616 or end of a game level) of the at least one data stream of the one or more data streams. For example, the first application initiates the stop request and the stop request is received by the second application (e.g., the operating system of the electronic device).

Figure 6D:
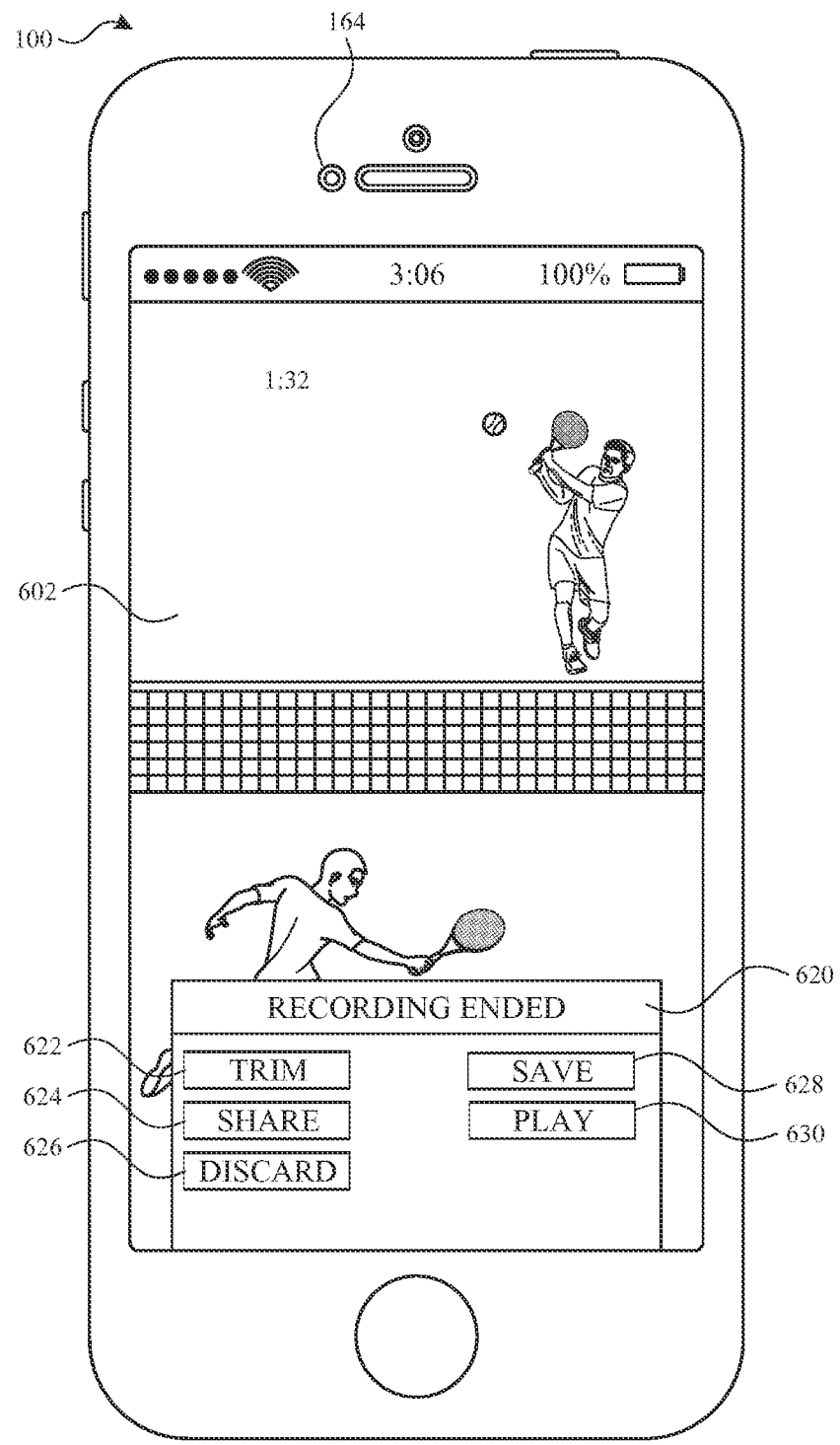

In FIG. 6D, in response to detecting the stop request, the electronic device stops (e.g., by the second application) recording of the at least one data stream of the one or more data streams. In FIG. 6D, as described in detail below, in response to detecting the stop request, the electronic device displays, on the display, a second user interface 620 of the second application.

In some embodiments, the first application (e.g., game application) initiates the record request in response to a user input (e.g., detecting activation of a record affordance 606 of the first application; detecting activation of a level-start affordance that starts a game level, such as by selecting a button that is associated with text indicating that video will be recorded such as "play level with recording" instead of selecting a button that is not associated with text indicating that video will be recorded, such as "play level").

In some embodiments, the record request specifies a request for recording audio data and video data of the first application (e.g., video displayed on the display of the device and audio output by the device).

In some embodiments, the record request specifies a request for recording event information of the first application. The electronic device receives a playback request. In response to receiving the playback request, the electronic device reproduces the audio and video of the first application based on the event information of the first application. For example, the event information enables the game application to recreate a playthrough of a game from multiple different angles, rather than merely playing back sounds and images generated by the game during the playthrough). For example, the event information includes the location of an animated game player within a scene of the game.

In some embodiments, the electronic device includes a microphone. The record request specifies a request for recording audio data and video data of the first application and audio data received at the microphone of the device. For example, the electronic device records audio/video of the first application and sounds made by the user during the game play (e.g., the user yelling or explaining why he is taking actions within the game).

In some embodiments, the electronic device includes a microphone and a camera sensor. The record request specifies a request for recording audio data and video data of the first application, audio received at the microphone of the device, and video received at the camera sensor of the device. For example, the electronic device records audio/video of the first application and sounds made by the user during the game play (e.g., the user yelling or explaining why he is taking actions within the game), and facial expressions of the user during the game play.

In some embodiments, while recording, the electronic device displays, on the display, a picture-in-picture video (e.g., 618) of the video received at the camera sensor of the device. For example, the device records the video received at the camera sensor as a data stream. For example, the video received at the camera sensor captures the user's reactions (e.g., facial expressions) as the user is playing the game. The device also displays the video received at the camera sensor during the recording (e.g., live or near-live) to allow the user to see the camera's field of view (e.g., what is being recorded).

In some embodiments, initiating the recording of the at least one data stream of the one or more data streams includes storing each data stream of the at least one data stream separately in memory (e.g., so that the some (or all) data streams can be combined or not combined at a later time to create a multimedia file).

In some embodiments, initiating the recording of the at least one data stream of the one or more data streams includes storing, to memory, synchronization data to synchronize playback of the at least one data stream (e.g., so that the data streams can be synchronized at a later time such that the audio/video of the first application are in sync with any recorded audio from the microphone and any recorded video from the camera sensor).

In some embodiments, the user interface (e.g., 608) for the second application further includes a visual indicator (e.g., 610) indicating the at least one data stream of the one or more data streams requested to be recorded. For example, the second application includes an indication asking "Allow recording of: game play and your audio and video?" or an indication that "The audio/video of the game and your voice will be recorded."

In some embodiments, the electronic device stores the recording of the at least one data stream of the one or more data streams into a memory of the device (e.g., from the record time to the stoppage time). The first application does not have access to the stored recording of the at least one data stream of the one or more data streams. This provides additional security, as the first application does not have access to the recorded content without additional user confirmation. For example, the electronic device receives user confirmation to provide the first application access to the recorded at least one data stream of the one or more data streams. In response to receiving the user confirmation, the electronic device (e.g., via the second application) provides the first application with access to the recorded at least one data stream of the one or more data streams.

In some embodiments, the first application is a game. In response to initiating the recording of the at least one data stream of the one or more data streams, the electronic device receives by the first application a confirmation (e.g., from the second application) that recording has started. In response to receiving the confirmation that recording has started, the electronic device initiates a game play (e.g., starts a level of the game) of the first application.

In some embodiments, the user interface (e.g., 602) for the first application includes one or more visual objects (e.g., displayed affordances 616 or displayed timers "0:06") that are not recorded as part of the at least one data stream of the one or more data streams. The at least one data stream of the one or more data steams includes a video stream of the first application (e.g., of the displayed user interface 602). For example, the first application displays a pause affordance, a stop affordance (e.g., 616), an add bookmarkers affordance, and/or a timer (e.g., 0:06) indicating the duration of a current recording that is not recorded or stored in memory as part of the recording of the audio/video of the first application.

In some embodiments, in response to detecting the stop request, the electronic device displays, on the display, a second user interface (e.g., 620) of the second application. The second user interface (e.g., 620) of the second application provides an option (e.g., 624) for sharing (e.g., by email, by text message, via a social network) the recorded at least one data stream of the one or more data streams. For example, activating the option (e.g., 624) for sharing causes the electronic device to transmit the recorded at least one data stream of the one or more data streams to a remote server, provide an option to transmit the recorded at least one data stream of the one or more data streams, or provide the first application (or another application) with access to the recorded at least one data stream of the one or more data streams.

In some embodiments, in response to detecting the stop request, the electronic device displays, on the display, a second user interface (e.g., 620) of the second application. The second user interface (e.g., 620) of the second application provides one or more options to edit (e.g., 622) or playback (e.g., 630) the recorded at least one data stream of the one or more data streams. For example, the second user interface (e.g., 620) allows one or more of the following: discarding (e.g., via affordance 626) recorded streams; playing back (e.g., via playback affordance 630) of recorded streams (individually, a subset, or together), storing to memory (e.g., via affordance 628) trimming (e.g., via affordance 622) of recorded streams, adding voiceover (using a microphone of the device) to recorded streams, adding picture-in-picture video (using a camera sensor of the device) to recorded streams, overlaying indications of measured galvanic skin response data to recorded streams, overlaying indications of measured heart rate data to recorded streams, enabling and disabling of visual or audio indications corresponding to touch information from a touch-sensitive surface captured during the recording, or combining portions of different streams during different times of the recording (e.g., turn on video picture-in-picture for a portion of the recording) using individual recorded data streams.

Figure 6E:
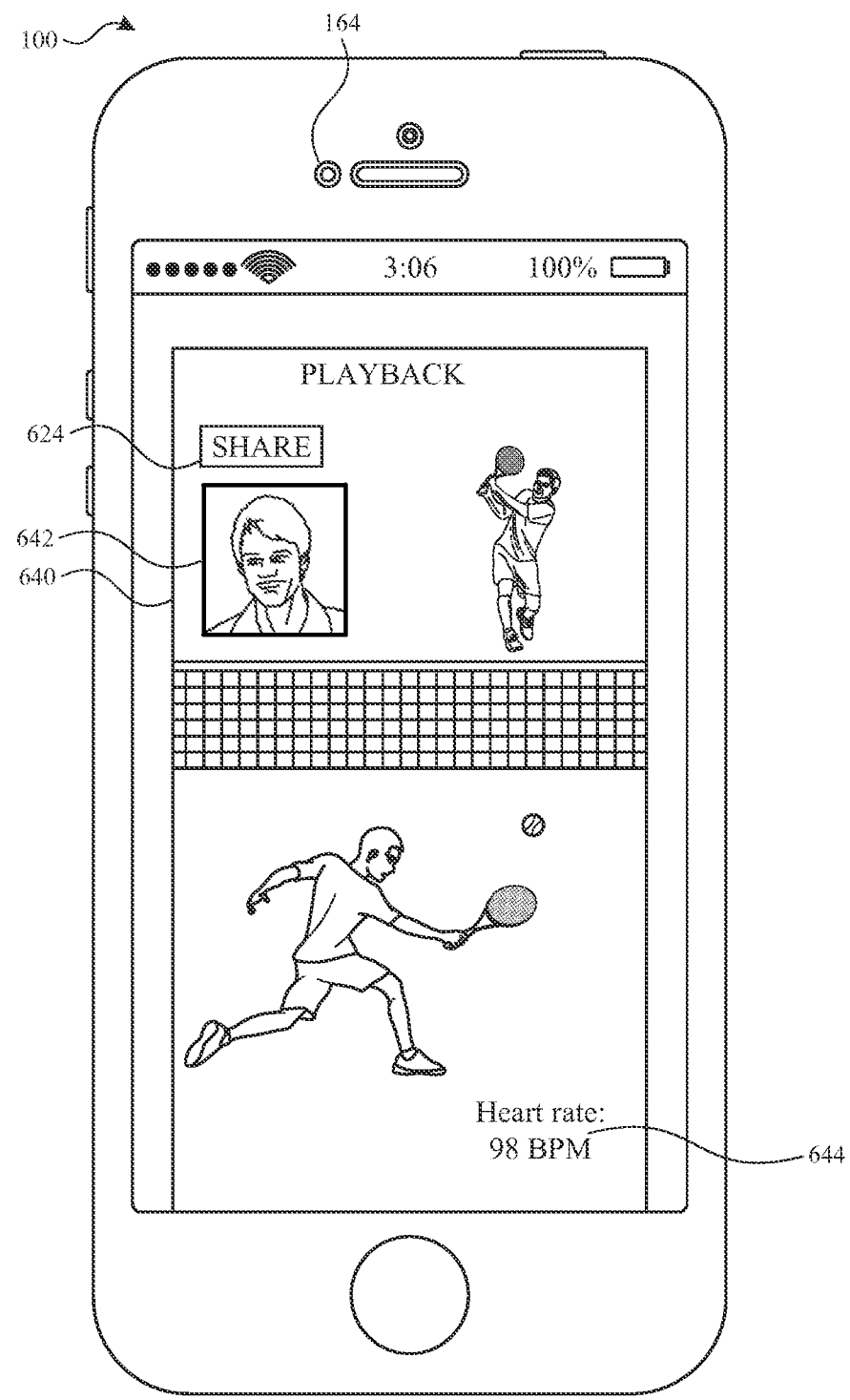

As illustrated in FIG. 6E, in some embodiments, the device detects activation of playback affordance 630. In response to detecting activation of playback affordance 630, the electronic device displays playback user interface 640. Playback user interface 640 includes an option to share (e.g., via affordance 624) the audio/video being played back. In some examples, the audio/video being played back includes combinations of data streams, such as picture-in-picture video 642 of the video received at the camera sensor of the device during game play and heart rate information 644 detected by a second electronic device, as described below.

In some embodiments, the one or more data streams include a remote data stream received from a second electronic device different from the first electronic device. For example, the electronic device receives heart rate information detected by a paired smartwatch or recorded video information received from a camera sensor of a connected smartphone. In some examples, as illustrated in FIG. 6E, information based on the remote data stream received from the second electronic device is available for display. For example, the remote data stream is synchronized in time with the other data streams. In this example, heart rate information 644 is displayed concurrently with the playback of audio/video of the second application, allowing a user of the device to correlate the user's heart rate with a portion of the game.

In some embodiments, the electronic device stores a temporal marker (or a plurality of temporal markers). The temporal marker (or each temporal marker of the plurality of temporal markers) is associated with a time of at least one of the one or more data streams. The temporal marker is based on information received from the first application (e.g., the game). The temporal marker allows marking at location of the data stream that is not at the beginning or end of the data stream (e.g., a midpoint). For example, the second application creates markers based on information from the second application (e.g., times when achievements were unlocked, laps were completed, levels began or ended, etc.) to allow the user to subsequently quickly access, review, or those marked portions of the recording.

In some embodiments, the electronic device generates a highlight data stream (e.g., audio/video multimedia file) based on the temporal marker (or plurality of temporal markers) and based on a portion (e.g., but not all) of the at least one data stream of the one or more data streams. For example, the electronic device puts together a highlight video. In some embodiments, the portions of the at least one data stream of the one or more data streams included in the highlight video are based on measured galvanic skin response data collected during the recording or heart rate data measured during the recording. In some embodiments, if the electronic device determines that a user has opted-in, the electronic device indexes recordings at different points in a game using predefined markers and uploads the videos to one or more servers. The electronic device then enables users to search for uploaded videos that include a requested marker so that users can find and view the videos. This allows users to quickly find videos that they can watch to see how other players have played a particular level or aspect of a game, such has how players have solved a puzzle in a game.

FIG. 7 is a flow diagram illustrating a method for recording data streams using an electronic device in accordance with some embodiments. Method 700 is performed at a device (e.g., 100, 300, 500) with a display. Some operations in method 700 may be combined, the order of some operations may be changed, and some operations may be omitted.

As described below, method 700 provides an intuitive way for recording data streams. The method reduces the cognitive burden on a user for recording data streams, thereby creating a more efficient human-machine interface. For battery-operated computing devices, enabling a user to recording data streams faster and more efficiently conserves power and increases the time between battery charges.

At block 702, the electronic device displays, on the display, a user interface (e.g., 602) for a first application (e.g., a game application; a workout application for an outdoor work out such as a run or bike ride or an indoor workout). For example, the device displays a tennis game application. In some embodiments, for security reasons, the first application (e.g., the game application) is restricted from accessing or recording one or more types of data streams associated with user activity while using the device (e.g., the first application is prohibited from generating screen recordings and/or recording user activity via a camera or microphone of the device).

At block 704, the electronic device detects a record request (e.g., via an API call based on activation of record affordance 604) from the first application (e.g., the game application) to a second application (e.g., an operating system of the electronic device or another application on the electronic device that has privileges to record data streams associated with user activity while using the device that the first application is prohibited from recording). The record request corresponds to a request for the second application to initiate recording of one or more data streams that include at least one data stream generated by the first application (or channels; such as an application video channel of the first application, an application audio channel of the first application, an audio input channel received at a microphone of the electronic device, a video input channel received at a camera sensor of the electronic device). In some examples, at least one of the data streams is associated with the first application (e.g., one of the data streams is a data stream of video or audio output by the first application).

At block 706, in response to detecting the record request from the first application (e.g., to the second application), the electronic device displays, on the display, a user interface (e.g., 608) for the second application, the user interface (e.g., 608) for the second application including a confirmation affordance (e.g., 612). For example, the device requests user confirmation that it is acceptable to allow the electronic device to record game play (e.g., audio/video data streams of the game), audio received at a microphone of the electronic device, and a video received at a camera sensor (e.g., 164) of the electronic device. In some examples, prior to (and, optionally, concurrent with) detecting the record request, the electronic device displays an indication 606 of the one or more data streams to be requested for recording.

At block 708, the electronic device detects (e.g., by the second application) activation (e.g., by the user) of the confirmation affordance (e.g., 612).

At block 710, in response to detecting activation of the confirmation affordance (e.g., 612), the electronic device initiates (e.g., by the second application) a recording of at least one data stream of the one or more data streams. Alternatively, if the device detects (e.g., by the second application) activation (e.g., by the user) of a decline affordance (e.g., 614), the electronic device forgoes initiating the recording of at least one data stream of the one or more data streams. In some examples, the electronic device concurrently displays an indication (e.g., 610) of the one or more data streams to be requested for recording with the confirmation affordance (e.g., 612).

At block 712, the electronic device detects a stop request (e.g., via an API call) requesting stoppage of recording (e.g., based on user activation of stop affordance 616 or end of a game level) of the at least one data stream of the one or more data streams. For example, the first application initiates the stop request and the stop request is received by the second application (e.g., the operating system of the electronic device).

At block 714, in response to detecting the stop request, the electronic device stops (e.g., by the second application) recording of the at least one data stream of the one or more data streams.

In some embodiments, the first application (e.g., game application) initiates the record request in response to a user input (e.g., detecting activation of a record affordance 606 of the first application; detecting activation of a level-start affordance that starts a game level, such as by selecting a button that is associated with text indicating that video will be recorded such as "play level with recording" instead of selecting a button that is not associated with text indicating that video will be recorded, such as "play level").

In some embodiments, the record request specifies a request for recording audio data and video data of the first application (e.g., video displayed on the display of the device and audio output by the device).

In some embodiments, the record request specifies a request for recording event information of the first application. The electronic device receives a playback request. In response to receiving the playback request, the electronic device reproduces the audio and video of the first application based on the event information of the first application. For example, the event information enables the game application to recreate a playthrough of a game from multiple different angles, rather than merely playing back sounds and images generated by the game during the playthrough). For example, the event information includes the location of an animated game player within a scene of the game.

In some embodiments, the electronic device includes a microphone. The record request specifies a request for recording audio data and video data of the first application and audio data received at the microphone of the device. For example, the electronic device records audio/video of the first application and sounds made by the user during the game play (e.g., the user yelling or explaining why he is taking actions within the game).

In some embodiments, the electronic device includes a microphone and a camera sensor. The record request specifies a request for recording audio data and video data of the first application, audio received at the microphone of the device, and video received at the camera sensor of the device. For example, the electronic device records audio/video of the first application and sounds made by the user during the game play (e.g., the user yelling or explaining why he is taking actions within the game), and facial expressions of the user during the game play.

In some embodiments, while recording, the electronic device displays, on the display, a picture-in-picture video (e.g., 618) of the video received at the camera sensor of the device. For example, the device records the video received at the camera sensor as a data stream. For example, the video received at the camera sensor captures the user's reactions (e.g., facial expressions) as the user is playing the game. The device also displays the video received at the camera sensor during the recording (e.g., live or near-live) to allow the user to see the camera's field of view (e.g., what is being recorded).

In some embodiments, initiating the recording of the at least one data stream of the one or more data streams includes storing each data stream of the at least one data stream separately in memory (e.g., so that the some (or all) data streams can be combined or not combined at a later time to create a multimedia file).

In some embodiments, initiating the recording of the at least one data stream of the one or more data streams includes storing, to memory, synchronization data to synchronize playback of the at least one data stream (e.g., so that the data streams can be synchronized at a later time such that the audio/video of the first application are in sync with any recorded audio from the microphone and any recorded video from the camera sensor).

In some embodiments, the user interface (e.g., 608) for the second application further includes a visual indicator (e.g., 610) indicating the at least one data stream of the one or more data streams requested to be recorded. For example, the second application includes an indication asking "Allow recording of: game play and your audio and video?" or an indication that "The audio/video of the game and your voice will be recorded."

In some embodiments, the electronic device stores the recording of the at least one data stream of the one or more data streams into a memory of the device (e.g., from the record time to the stoppage time). The first application does not have access to the stored recording of the at least one data stream of the one or more data streams. This provides additional security, as the first application does not have access to the recorded content without additional user confirmation. For example, the electronic device receives user confirmation to provide the first application access to the recorded at least one data stream of the one or more data streams. In response to receiving the user confirmation, the electronic device (e.g., via the second application) provides the first application with access to the recorded at least one data stream of the one or more data streams.

In some embodiments, the first application is a game. In response to initiating the recording of the at least one data stream of the one or more data streams, the electronic device receives by the first application a confirmation (e.g., from the second application) that recording has started. In response to receiving the confirmation that recording has started, the electronic device initiates a game play (e.g., starts a level of the game) of the first application.

In some embodiments, the user interface (e.g., 602) for the first application includes one or more visual objects (e.g., displayed affordances 616 or displayed timers "0:06") that are not recorded as part of the at least one data stream of the one or more data streams. The at least one data stream of the one or more data steams includes a video stream of the first application (e.g., of the displayed user interface 602). For example, the first application displays a pause affordance, a stop affordance (e.g., 616), an add bookmarkers affordance, and/or a timer (e.g., 0:06) indicating the duration of a current recording that is not recorded or stored in memory as part of the recording of the audio/video of the first application.

In some embodiments, in response to detecting the stop request, the electronic device displays, on the display, a second user interface (e.g., 620) of the second application. The second user interface (e.g., 620) of the second application provides an option (e.g., 624) for sharing (e.g., by email, by text message, via a social network) the recorded at least one data stream of the one or more data streams. For example, activating the option (e.g., 624) for sharing causes the electronic device to transmit the recorded at least one data stream of the one or more data streams to a remote server, provide an option to transmit the recorded at least one data stream of the one or more data streams, or provide the first application with access to the recorded at least one data stream of the one or more data streams.

In some embodiments, in response to detecting the stop request, the electronic device displays, on the display, a second user interface (e.g., 620) of the second application. The second user interface (e.g., 20) of the second application provides one or more options to edit (e.g., 622) or playback (e.g., 630) the recorded at least one data stream of the one or more data streams. For example, the second user interface (e.g., 620) allows one or more of the following: discarding (e.g., via affordance 626) recorded streams; playing back (e.g., via playback affordance 630) of recorded streams (individually, a subset, or together), storing to memory (e.g., via affordance 628) trimming (e.g., via affordance 622) of recorded streams, adding voiceover (using a microphone of the device) to recorded streams, adding picture-in-picture video (using a camera sensor of the device) to recorded streams, overlaying indications of measured galvanic skin response data to recorded streams, overlaying indications of measured heart rate data to recorded streams, enabling and disabling of visual or audio indications corresponding to touch information from a touch-sensitive surface captured during the recording, or combining portions of different streams during different times of the recording (e.g., turn on video picture-in-picture for a portion of the recording) using individual recorded data streams.

In some embodiments, the device detects activation of playback affordance (e.g., 630). In response to detecting activation of playback affordance (e.g., 630), the electronic device displays playback user interface (e.g., 640). Playback user interface (e.g., 640) includes an option to share (e.g., via affordance 624) the audio/video being played back. In some examples, the audio/video being played back includes combinations of data streams, such as picture-in-picture video (e.g., 642) of the video received at the camera sensor of the device during game play and heart rate information (e.g., 644) detected by a second electronic device, as described below.

In some embodiments, the one or more data streams include a remote data stream received from a second electronic device different from the first electronic device. For example, the electronic device receives heart rate information detected by a paired smartwatch or recorded video information received from a camera sensor of a connected smartphone. In some examples, information based on the remote data stream received from the second electronic device is available for display. For example, the remote data stream is synchronized in time with the other data streams. For example, heart rate information (e.g., 644) is displayed concurrently with the playback of audio/video of the second application, allowing a user of the device to correlate the user's heart rate with a portion of the game.

In some embodiments, the electronic device stores a temporal marker (or a plurality of temporal markers). The temporal marker (or each temporal marker of the plurality of temporal markers) is associated with a time of at least one of the one or more data streams. The temporal marker is based on information received from the first application (e.g., the game). The temporal marker allows marking at location of the data stream that is not at the beginning or end of the data stream. For example, the second application creates markers based on information from the second application (e.g., times when achievements were unlocked, laps were completed, levels began or ended, etc.) to allow the user to subsequently quickly access, review, or those marked portions of the recording.

In some embodiments, the electronic device generates a highlight data stream (e.g., audio/video multimedia file) based on the temporal marker (or plurality of temporal markers) and based on a portion (e.g., but not all) of the at least one data stream of the one or more data streams. For example, the electronic device puts together a highlight video. In some embodiments, the portions of the at least one data stream of the one or more data streams included in the highlight video are based on measured galvanic skin response data collected during the recording or heart rate data measured during the recording. In some embodiments, the electronic device determines that a user has opted-in, the electronic device indexes recordings at different points in a game using predefined markers and uploads the videos to one or more servers. The electronic device then enables users to search for uploaded videos that include a requested marker so that users can find and view the videos. This allows users to quickly find videos that they can watch to see how other players have played a particular level or aspect of a game, such has how players have solved a puzzle in a game.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the data streams, affordances, and applications of method 900 optionally have one or more of the characteristics of the data streams, affordances, and applications of method 700. For brevity, these details are not repeated below.

FIGS. 8A-8I illustrate exemplary user interfaces for recording data streams, in accordance with some embodiments. The user interfaces in these figures are used to illustrate the processes described below, including the processes in FIG. 9.

Figure 8A:
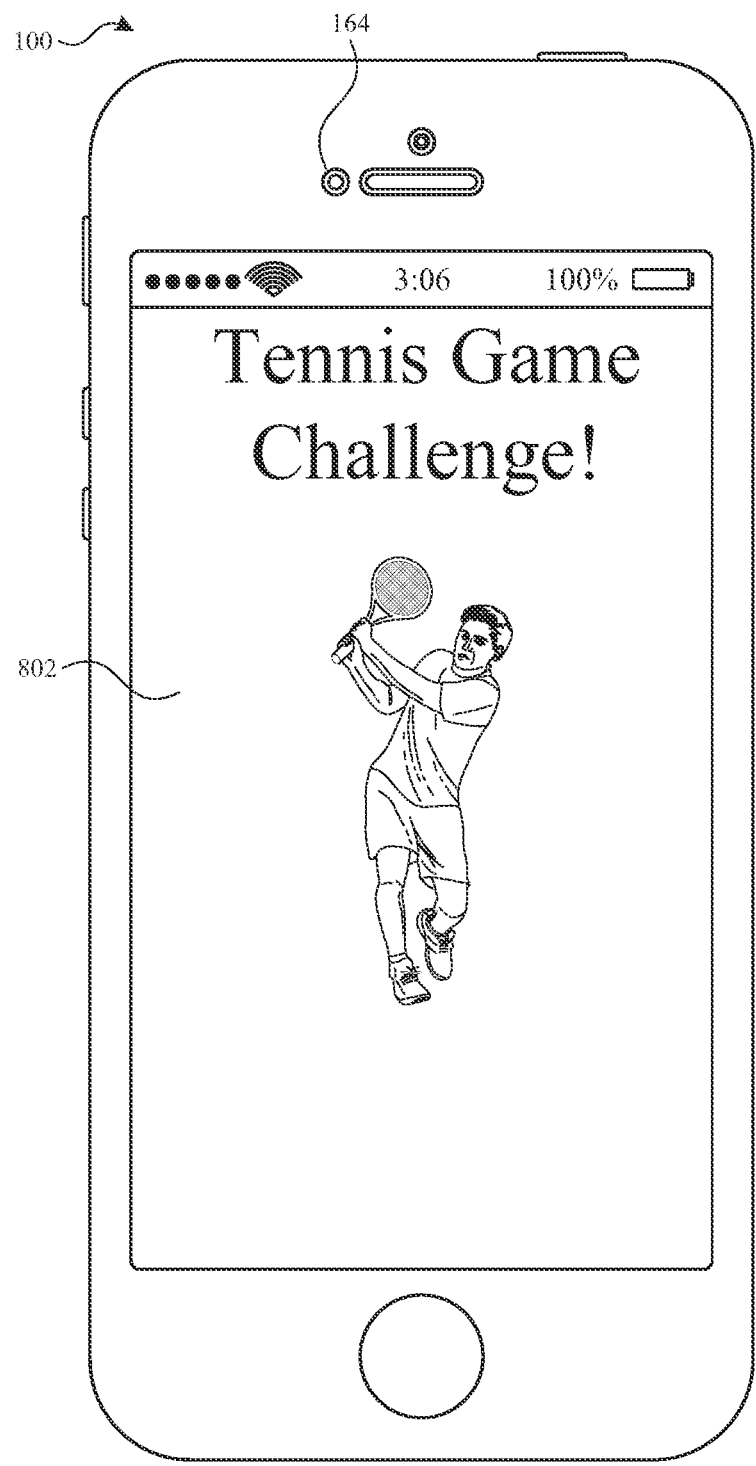
FIGS. 8A-8I illustrate exemplary user interfaces for recording and playing audio and video in accordance with some embodiments.

At FIG. 8A, in some embodiments, the electronic device displays a user interface (e.g., 802) for a first application (e.g., a game application). At FIG. 8B, the electronic device concurrently displays, on the display, the user interface (e.g., 802) for a first application (e.g., a game application, a workout application for an outdoor work out such as a run or bike ride or an indoor workout) and a user interface (e.g., 804A; 804B; a control user interface without a recording affordance; a control user interface with a recording affordance; a recording affordance 810) for a second application (e.g., an operating system of the electronic device or another application on the electronic device that has privileges to record data streams associated with user activity while using the device that the first application is prohibited from recording). At least a portion of the user interface (e.g., 804A; 804B; 810) for the first application is overlaid by at least a portion of the user interface for the second application. The user interface (e.g., 804A; 804B; 810) for the second application includes a record affordance (e.g., which is part of the at least a portion of the user interface for the second application).

Figure 8B:
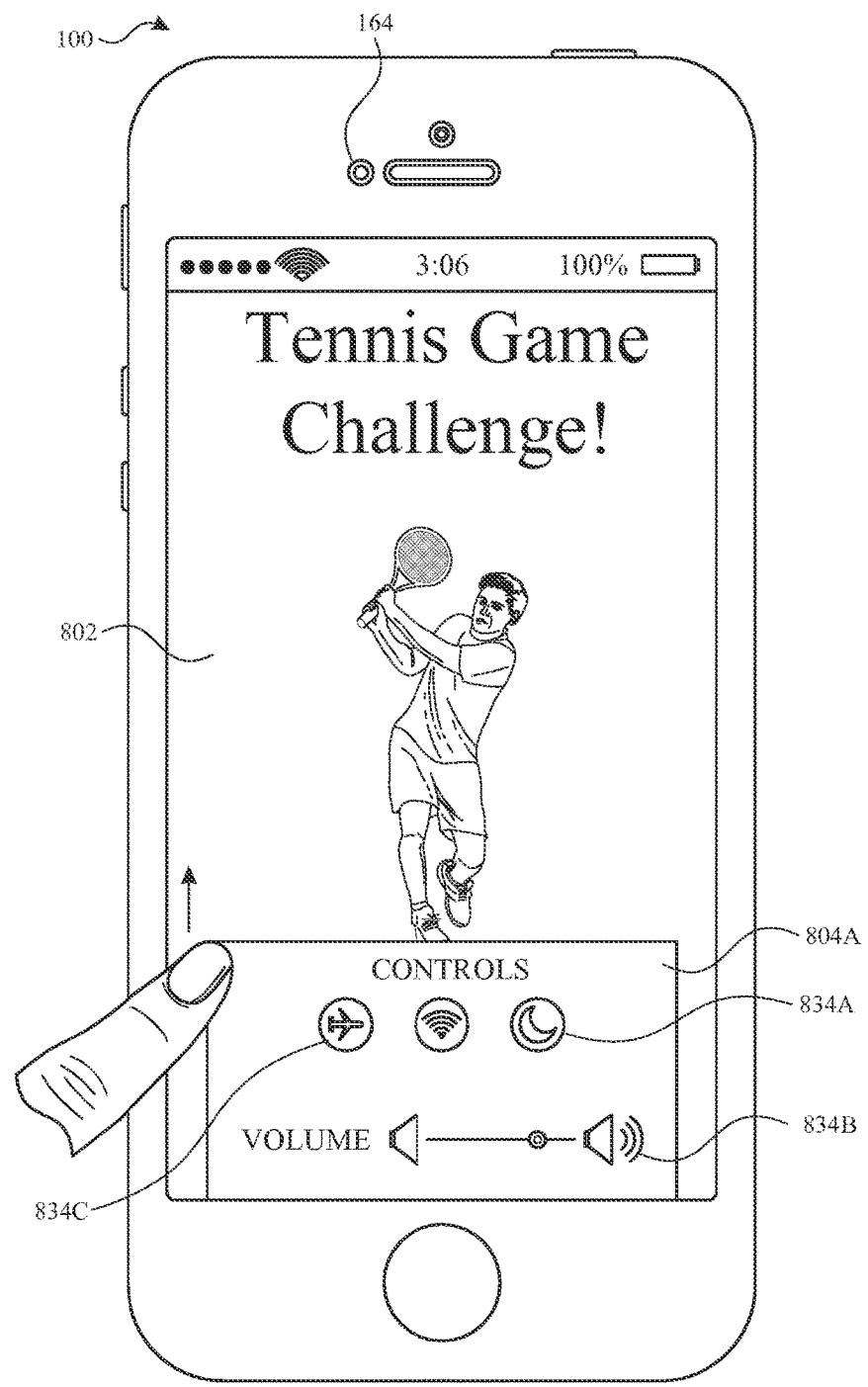
Figure 8C:
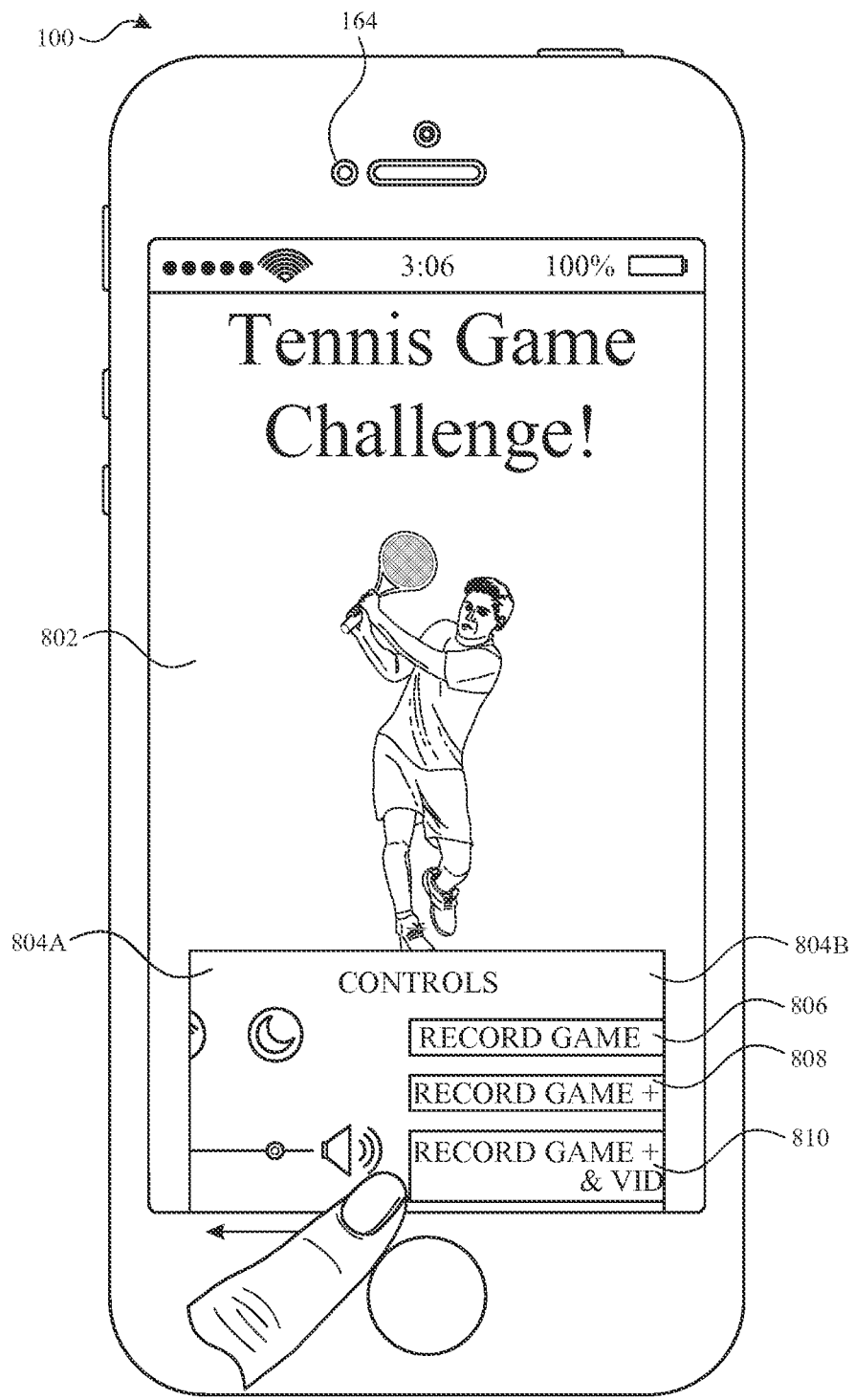
Figure 8D:
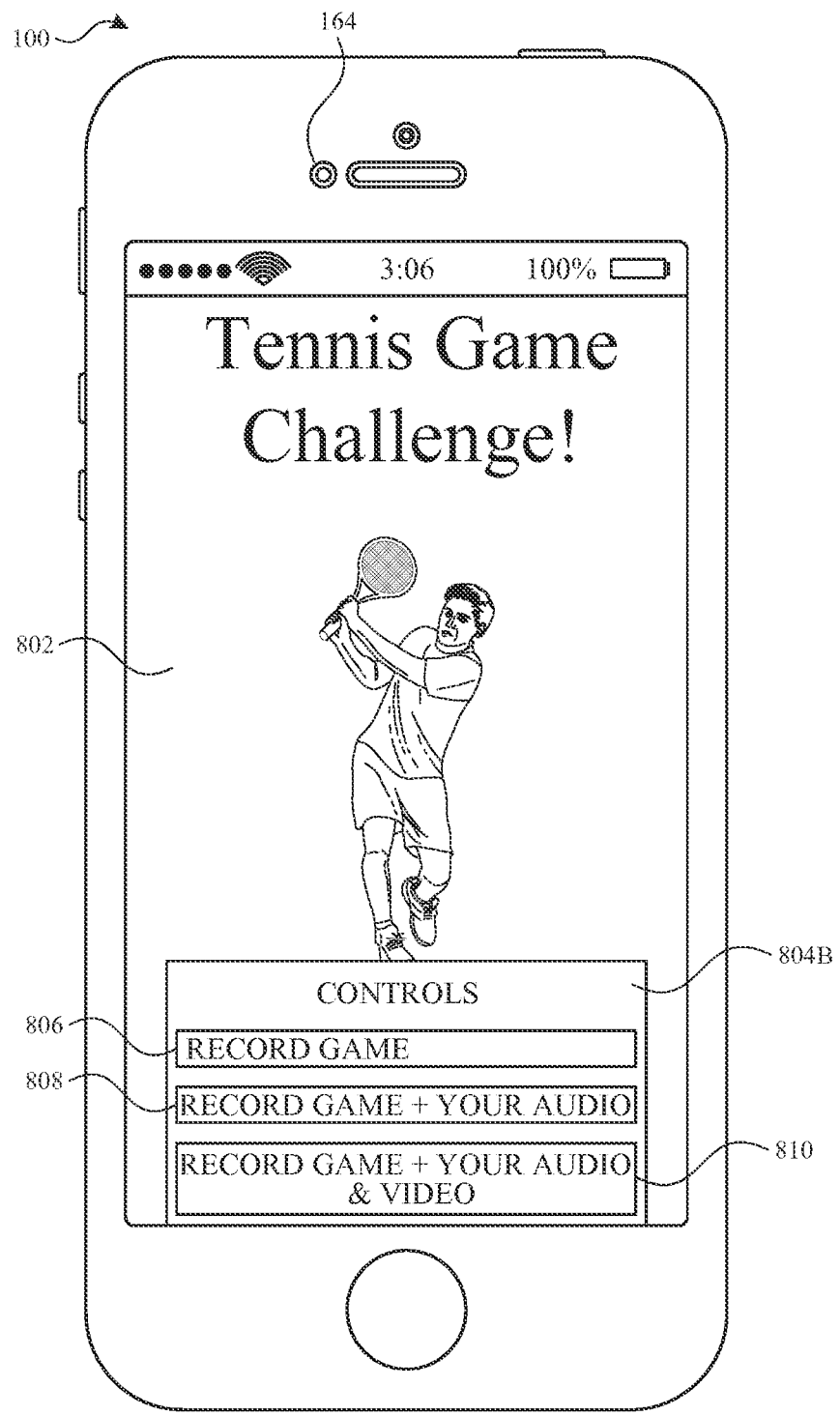
Figure 9:
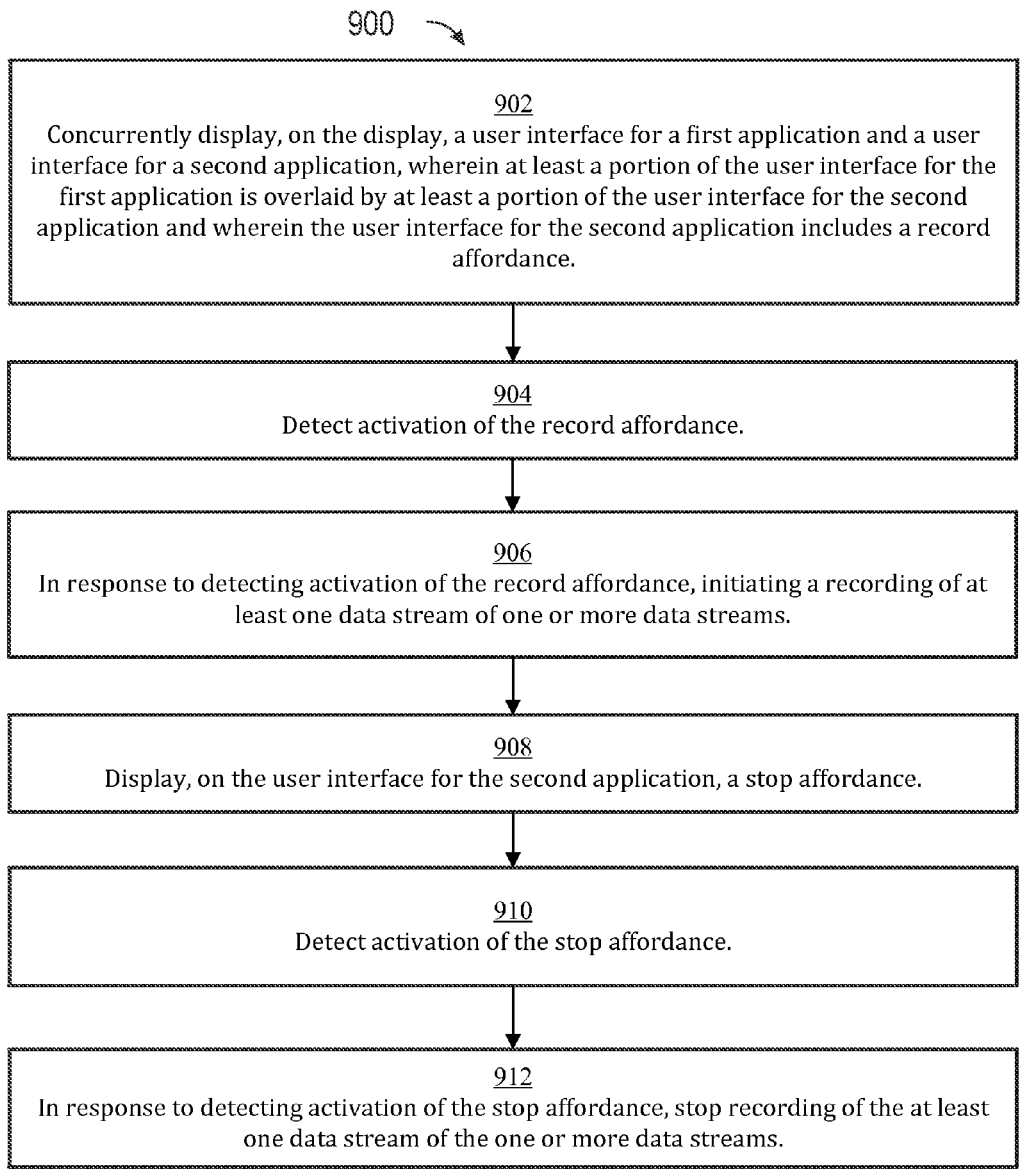
FIG. 9 is a flow diagram illustrating methods of recording and playing audio and video in accordance with some embodiments.

In some embodiments, as illustrated in FIG. 8B and as described in detail below, a first control user interface 804A for the second application does not include a record user interface. As illustrated in FIG. 8C, the device detects a swipe input (e.g., horizontal) associated with user interface 804A. As illustrated in FIG. 8D, in response to detecting the swipe input, the electronic device displays user interface 804B, which includes record affordance 810.

Figure 8E:
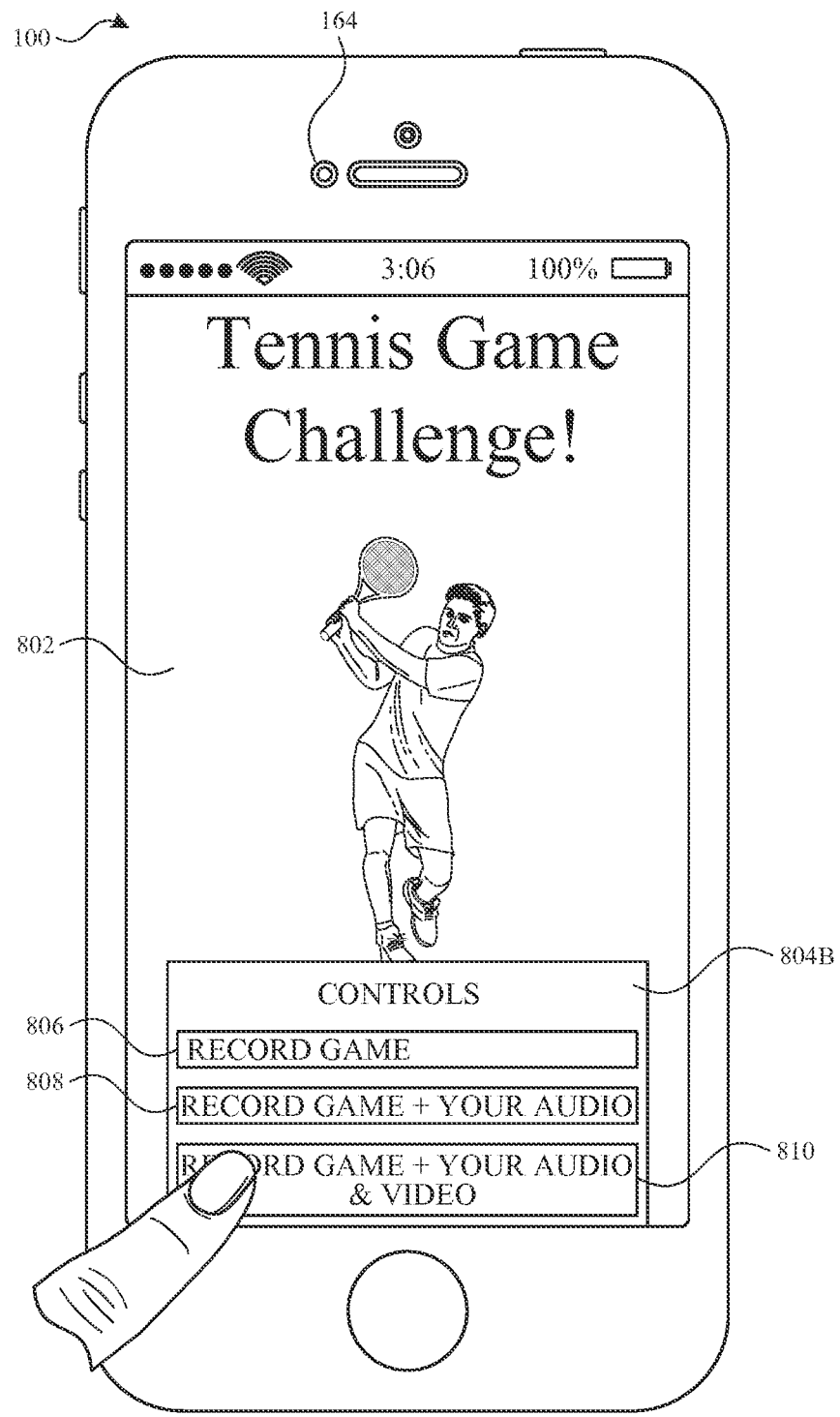

As illustrated in FIG. 8E, the electronic device detects (e.g., by the second application) activation (e.g., by the user) of the record affordance (e.g., 810).

Figure 8F:
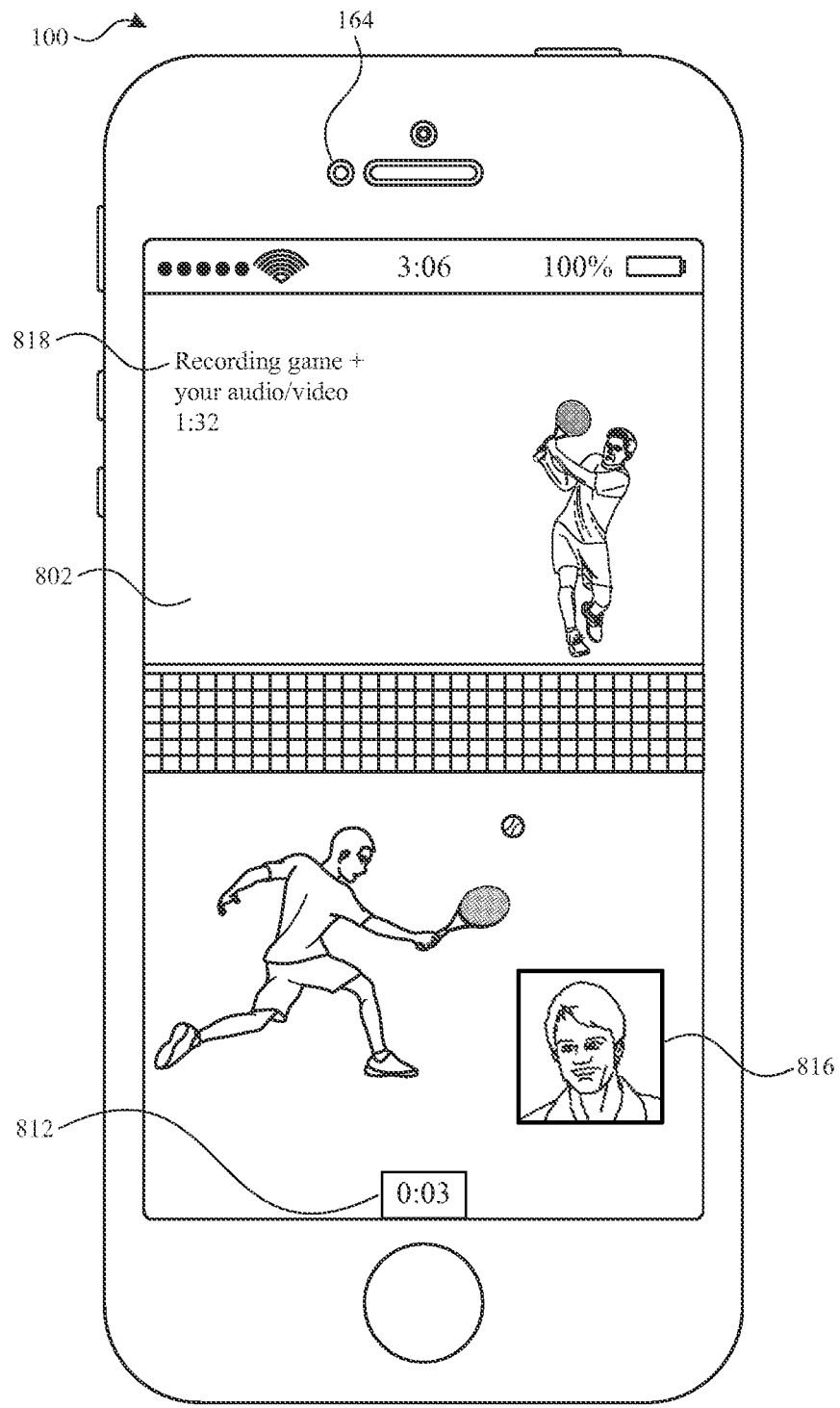

As illustrated in FIG. 8F, in response to detecting activation of the record affordance (e.g., 810), the electronic device initiates (e.g., by the second application) a recording of at least one data stream of one or more data streams. In some examples, the at least one of the data streams includes a data stream associated with the first application (e.g., the video or audio output of the first application). For example, the electronic device displays an indication (e.g., 818) that indicates that the electronic device is recording one or more data streams.

Figure 8G:
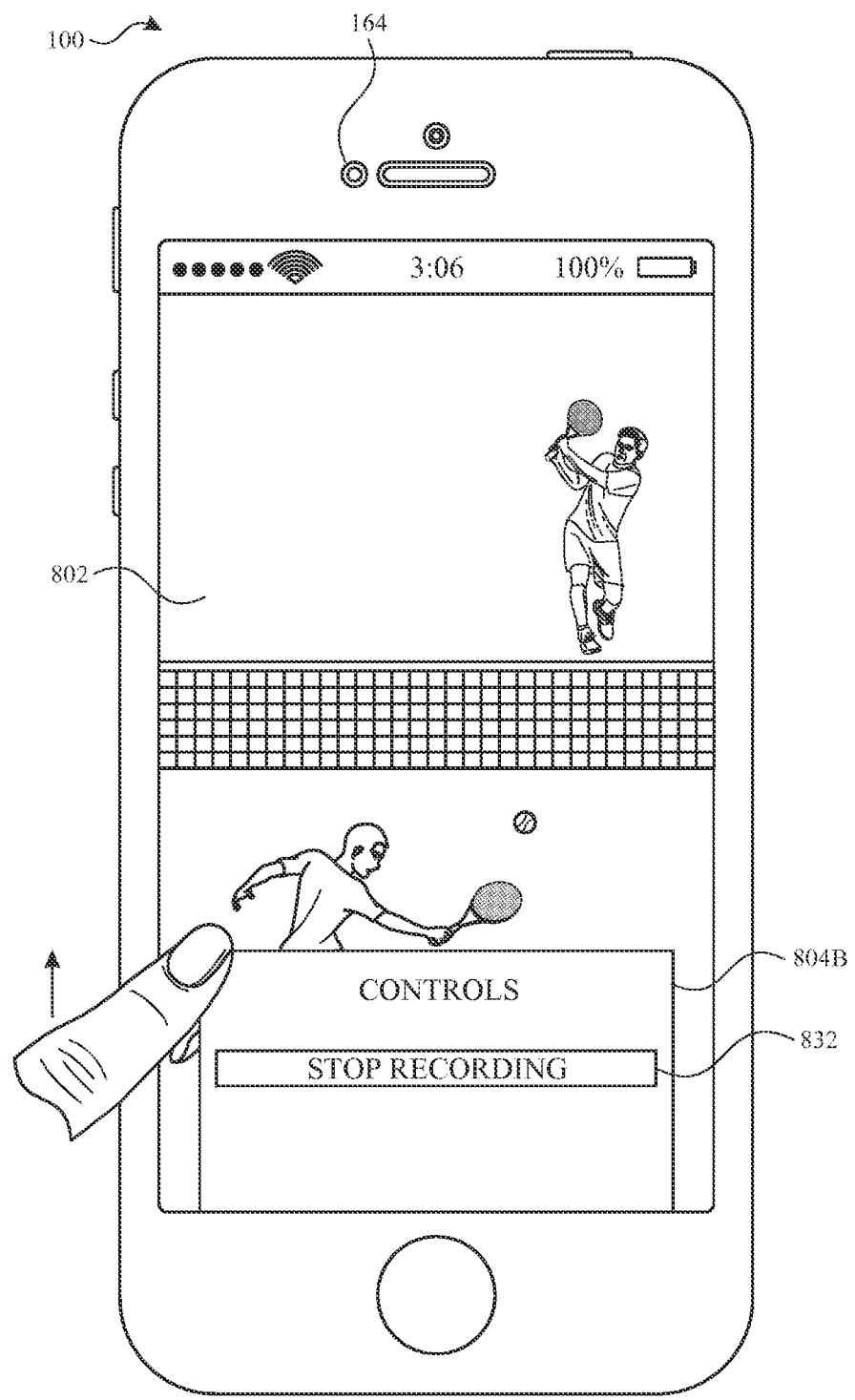

As illustrated in FIG. 8G, the electronic device displays, on the user interface for the second application, a stop affordance (e.g., control user interface with stop affordance 832; a standalone stop affordance). In some examples, the stop affordance is displayed in response to detecting a vertical swipe.

Figure 8H:
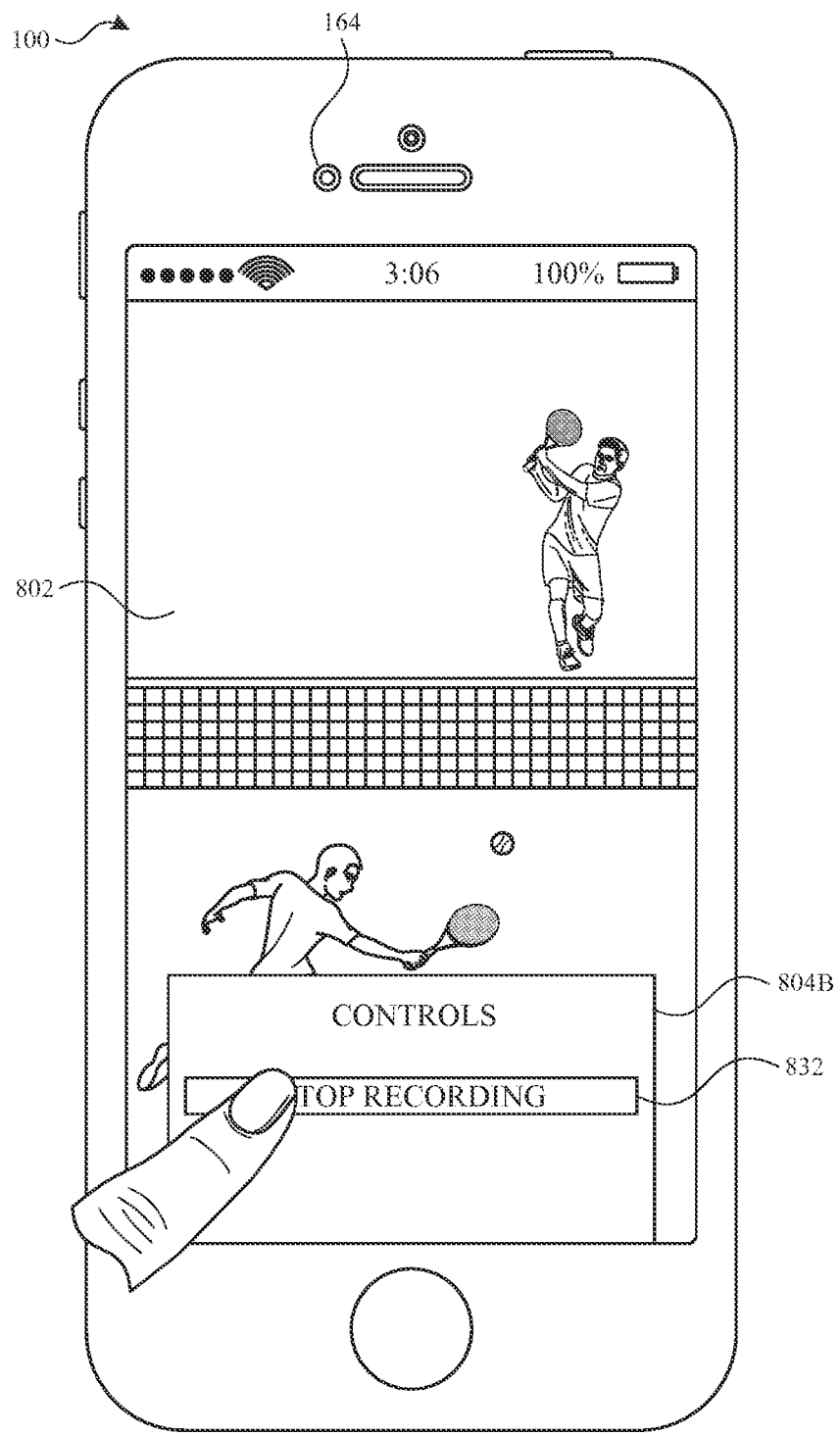

As illustrated in FIG. 8H, the electronic device detects (e.g., by the second application) activation (e.g., by the user) of the stop affordance (e.g., 832). In response to detecting activation of the stop affordance, the electronic device stops recording of the at least one data stream of the one or more data streams.

In some embodiments, the electronic device includes a touch-sensitive surface. As illustrated in FIG. 8B, prior to concurrently displaying, on the display, the user interface for the first application and the user interface for the second application, the electronic device receives a first swipe input in a first direction (e.g., up direction) at the touch-sensitive surface. In response to receiving the swipe input, the electronic device displays a control user interface (e.g., 804A) for the second application. The control user interface does not include the record affordance. As illustrated in FIG. 8C, while displaying the control user interface (e.g., 804A) for the second application, the electronic device receives a second swipe input in a second direction (e.g., left direction) at the touch-sensitive surface (e.g., at a location corresponding to the control user interface (e.g., 804A). The record affordance (e.g., 810) of the user interface for the second application is displayed as part of the control user interface (e.g., 804B) in response to receiving the second swipe input.

In some embodiments, prior to concurrently displaying, on the display, the user interface (e.g., 802) for the first application and the user interface (e.g., 804B) for the second application, the electronic device receives a request to display controls for controlling functions of the second application (e.g., a request to display user interface 804A). In response to receiving the request to display the control user interface (e.g., 804A, 804B), the electronic device displays a control user interface that includes one or more controls (e.g., 834A, 834B; for controlling functions of the second application. In some embodiments, the control user interface is displayed concurrently with at least a portion of the user interface of the first application. In some embodiments, the control user interface is displayed as a semi-transparent or transparent overlay on top of at least a portion of the user interface of the first application. In some embodiments, the control user interface includes other options for controlling functions of the device that are managed by the second application, such as volume (e.g., by 834B), the on/off status of wireless antennas (e.g., by 834C), media playback, etc. While the control user interface (e.g., 804A, 804B) is displayed, the electronic device displays the record affordance 810 as part of the control user interface (e.g., 804B).

In some embodiments, in response to detecting activation of the record affordance (e.g., 810), the electronic device updates the display to not include the record affordance (e.g., 810). For example, the record affordance is replaced with the stop affordance. For another example, in response to detecting activation of the record affordance (e.g., 810), the control user interface (e.g., 804A, 804B including the user interface for the second application) slides away (e.g., down) and off the display. In some embodiments, when the control user interface slides away, a tongue (e.g., 812; a handle) for the control user interface starts (or continues) to be displayed (e.g., overlaid on top of the user interface of the first application). The tongue (e.g., 812) indicates that recording is in progress. In some examples, the tongue (e.g., 812) also includes a displayed record time.

In some embodiments, the control user interface (e.g., 804A, 804B) includes a record affordance (e.g., 810) that is controlled by the second application (e.g., the operating system) and is overlaid on top of the user interface (e.g., 802) for the first application (e.g., the game). In some embodiments, the record button (e.g., 810) is displayed without displaying the control user interface.

In some embodiments, updating the display to not include the record affordance (e.g., 810) includes replacing the record affordance with the stop affordance (e.g., 832).

In some embodiments, the at least the portion of the user interface (e.g., 804B, 832) for the second application is not recorded as part of the at least one data stream of the one or more data streams. For example, the controls and timers of the second application are not part of the record streams.

In some embodiments, the second application provides an option (e.g., affordance 806) for recording audio data and video data of the first application (e.g., audio/video displayed/played on the device).

In some embodiments, the second application provides an option (e.g., 806, 808, 810) for recording event information of the first application that can be used to reproduce audio and video of the first application (e.g., data enabling the game recreate a playthrough of a game from multiple different angles rather than just recording the audio/video generated by the game during the playthrough). For example, the device receives a playback request, and in response to receiving the playback request, the electronic device reproducing the audio and video of the first application based on the event information of the first application.

In some embodiments, the electronic device includes a microphone. The second application provides an option (e.g., affordance 808) for recording audio data and video data of the first application and audio received at the microphone of the device.

In some embodiments, the electronic device includes a microphone and a camera sensor (e.g., 164). The second application provides an option (e.g., 810) for recording audio data and video data of the first application, audio received at the microphone of the device, and video received at the camera sensor (e.g., 164) of the device.

In some embodiments, while recording, the electronic device displays, on the display, a picture-in-picture video (e.g., 816) of the video received at the camera sensor (e.g., 164) of the device. For example, the device records the video received at the camera sensor as a data stream. For example, the video received at the camera sensor captures the user's reactions (e.g., facial expressions) as the user is playing the game. The device also displays the video received at the camera sensor during the recording (e.g., live or near-live) to allow the user to see the camera's field of view (e.g., what is being recorded).

In some embodiments, the electronic device initiates the recording of the at least one data stream of the one or more data streams includes storing each data stream of the at least one data stream separately in memory (e.g., so that the data streams can be combined or not combined at a later time to create a multimedia file).

In some embodiments, initiating the recording of the at least one data stream of the one or more data streams includes storing, to memory, synchronization data to synchronize playback of the at least one data stream (e.g., so that the data streams can be synchronized at a later time such that the audio/video of the application are in sync with any recording audio from the microphone and any recorded video from the camera sensor).

In some embodiments, while recording of the at least one data stream of one or more data streams is in progress, the electronic device displays a visual indicator (e.g., 812) of the second application that indicates the at least one data stream of the one or more data streams is being recorded. For example, the second application includes an indication that "The audio/video of the game and your voice are being recorded" or "Recording game+your audio/video." For another example, a tongue (e.g., 812) of the second application is displayed.

Figure 8I:
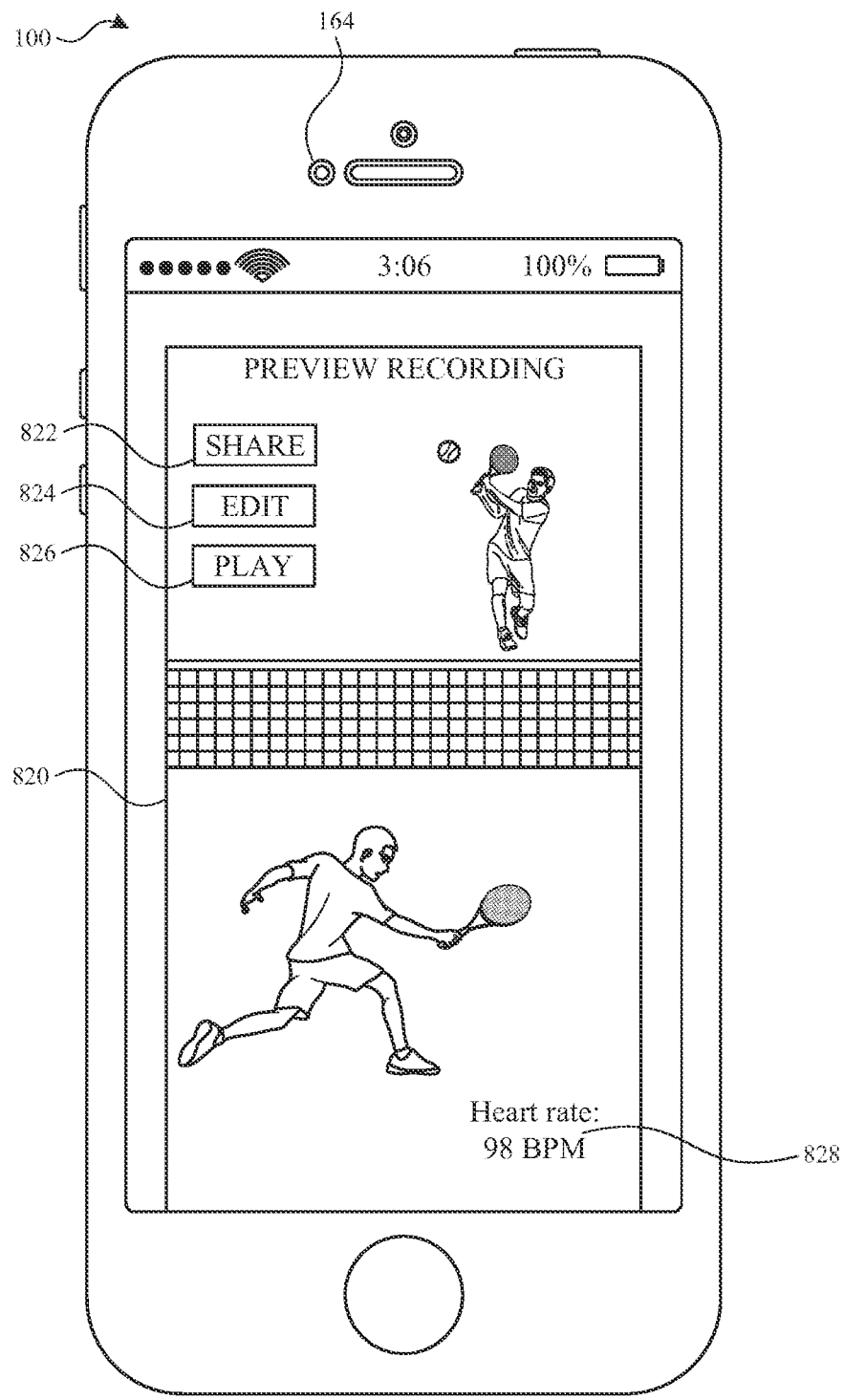

In some embodiments, as illustrated in FIG. 8I, in response to detecting activation of the stop affordance, the electronic device displays, on the display, a second user interface (e.g., 820) of the second application, wherein the second user interface of the second application provides an option (e.g., 822) for sharing (e.g., by email, by text message, via a social network) the recorded at least one data stream of the one or more data streams.

In some embodiments, as illustrated in FIG. 8I, in response to detecting activation of the stop affordance (e.g., 814C), the electronic device displays, on the display, a second user interface (e.g., 820) of the second application. The second user interface (e.g., 820) of the second application provides one or more options to edit (e.g., affordance 824) or playback (e.g., 826) the recorded at least one data stream of the one or more data streams. For example, the second user interface (e.g., 820) allows one or more of the following: playback of recorded streams (individually, a subset, or together), trimming of recorded streams, adding voiceover (using a microphone of the device) to recorded streams, adding picture-in-picture video (using a camera sensor of the device) to recorded streams, overlaying indications of measured galvanic skin response data to recorded streams, overlaying indications of measured heart rate data to recorded streams, enabling and disabling of visual or audio indications corresponding to touch information from a touch-sensitive surface captured during the recording, combining portions of different streams during different times of the recording (e.g., turn on video picture-in-picture for a portion of the recording) using recorded individual streams.

In some embodiments, the one or more data streams include a remote data stream received from a second electronic device different from the first electronic device. For example, the electronic device receives heart rate information detected by a paired smartwatch or recorded video information received from a camera sensor of a connected smartphone. For example, heart rate information (e.g., 823) is displayed concurrently with the playback of audio/video of the second application, allowing a user of the device to correlate the user's heart rate with a portion of the game.

In some embodiments, the electronic device stores a temporal marker. The temporal marker is associated with a time of at least one of the one or more data streams and wherein the temporal marker is based on information received from the first application (e.g., the game). The temporal marker allows marking at location of the data stream that is not at the beginning or end of the data stream. For example, the second application creates markers based on information from the second application (e.g., times when achievements were unlocked, laps were completed, levels began or ended, etc.) to allow the user to subsequently quickly access, review, or those marked portions of the recording.

In some embodiments, the electronic device generates a highlight data stream based on the temporal marker and based on a portion (e.g., but not all) of the at least one data stream of the one or more data streams. For example, the electronic device puts together a highlight video. In some embodiments, the portions of the at least one data stream of the one or more data streams included in the highlight video are based on measured galvanic skin response data collected during the recording or heart rate data measured during the recording. In some embodiments, the electronic device determines that a user has opted-in, the electronic device indexes recordings at different points in a game using predefined markers and uploads the videos to one or more servers. The electronic device then enables users to search for uploaded videos that include a requested marker so that users can view the videos. This allows users to quickly find videos that they can watch to see how other players have played a particular level or aspect of a game, such has how players have solved a puzzle in a game.

FIG. 9 is a flow diagram illustrating a method for recording data streams using an electronic device in accordance with some embodiments. Method 900 is performed at a device (e.g., 100, 300, 500) with a display. Some operations in method 900 may be combined, the order of some operations may be changed, and some operations may be omitted.

As described below, method 900 provides an intuitive way for recording data streams. The method reduces the cognitive burden on a user for recording data streams, thereby creating a more efficient human-machine interface. For battery-operated computing devices, enabling a user to recording data streams faster and more efficiently conserves power and increases the time between battery charges.

At block 902, the electronic device concurrently displays, on the display, the user interface (e.g., 802) for a first application (e.g., a game application, a workout application for an outdoor work out such as a run or bike ride or an indoor workout) and a user interface (e.g., 804A; 804B; a control user interface without a recording affordance; a control user interface with a recording affordance; a recording affordance 810) for a second application (e.g., an operating system of the electronic device or another application on the electronic device that has privileges to record data streams associated with user activity while using the device that the first application is prohibited from recording). At least a portion of the user interface (e.g., 804A; 804B; 810) for the first application is overlaid by at least a portion of the user interface for the second application. The user interface (e.g., 804A; 804B; 810) for the second application includes a record affordance (e.g., which is part of the at least a portion of the user interface for the second application).

At block 904, the electronic device detects (e.g., by the second application) activation (e.g., by the user) of the record affordance (e.g., 810).

At block 906, in response to detecting activation of the record affordance (e.g., 810), the electronic device initiates (e.g., by the second application) a recording of at least one data stream of one or more data streams. In some examples, the at least one of the data streams includes a data stream associated with the first application (e.g., the video or audio output of the first application). For example, the electronic device displays an indication (e.g., 818) that indicates that the electronic device is recording one or more data streams.

At block 908, the electronic device displays, on the user interface for the second application, a stop affordance (e.g., control user interface with stop affordance 832; a standalone stop affordance). In some examples, the stop affordance is displayed in response to detecting a vertical swipe.

At block 910, the electronic device detects (e.g., by the second application) activation (e.g., by the user) of the stop affordance (e.g., 832).

At block 912, in response to detecting activation of the stop affordance, the electronic device stops recording of the at least one data stream of the one or more data streams.

In some embodiments, the electronic device includes a touch-sensitive surface. Prior to concurrently displaying, on the display, the user interface for the first application and the user interface for the second application, the electronic device receives a first swipe input in a first direction (e.g., up direction) at the touch-sensitive surface. In response to receiving the swipe input, the electronic device displays a control user interface (e.g., 804A) for the second application. The control user interface does not include the record affordance. While displaying the control user interface (e.g., 804A) for the second application, the electronic device receives a second swipe input in a second direction (e.g., left direction) at the touch-sensitive surface (e.g., at a location corresponding to the control user interface (e.g., 804A). The record affordance (e.g., 810) of the user interface for the second application is displayed as part of the control user interface (e.g., 804B) in response to receiving the second swipe input.

Prior to concurrently displaying, on the display, the user interface (e.g., 802) for the first application and the user interface (e.g., 804B) for the second application, the electronic device receives a request to display controls for controlling functions of the second application (e.g., a request to display user interface 804A). In response to receiving the request to display the control user interface (e.g., 804A, 804B), the electronic device displays a control user interface that includes one or more controls (e.g., 834A, 834B; for controlling functions of the second application. In some embodiments, the control user interface is displayed concurrently with at least a portion of the user interface of the first application. In some embodiments, the control user interface is displayed as a semi-transparent or transparent overlay on top of at least a portion of the user interface of the first application. In some embodiments, the control user interface includes other options for controlling functions of the device that are managed by the second application, such as volume (e.g., by 834B), the on/off status of wireless antennas (e.g., by 834C), media playback, etc. While the control user interface (e.g., 804A, 804B) is displayed, the electronic device displays the record affordance 810 as part of the control user interface (e.g., 804B).

In some embodiments, in response to detecting activation of the record affordance (e.g., 810), the electronic device updates the display to not include the record affordance (e.g., 810). For example, the record affordance is replaced with the stop affordance. For another example, in response to detecting activation of the record affordance (e.g., 810), the control user interface (e.g., 804A, 804B including the user interface for the second application) slides away (e.g., down) and off the display. In some embodiments, when the control user interface slides away, a tongue (e.g., 812; a handle) for the control user interface starts (or continues) to be displayed (e.g., overlaid on top of the user interface of the first application). The tongue (e.g., 812) indicates that recording is in progress. In some examples, the tongue (e.g., 812) also includes a displayed record time.

In some embodiments, the control user interface (e.g., 804A, 804B) includes a record affordance (e.g., 810) that is controlled by the second application (e.g., the operating system) and is overlaid on top of the user interface (e.g., 802) for the first application (e.g., the game). In some embodiments, the record button (e.g., 810) is displayed without displaying the control user interface.

In some embodiments, updating the display to not include the record affordance (e.g., 810) includes replacing the record affordance with the stop affordance (e.g., 832).

In some embodiments, the at least the portion of the user interface (e.g., 804B, 832) for the second application is not recorded as part of the at least one data stream of the one or more data streams. For example, the controls and timers of the second application are not part of the record streams.

In some embodiments, the second application provides an option (e.g., affordance 806) for recording audio data and video data of the first application (e.g., audio/video displayed/played on the device).

In some embodiments, the second application provides an option (e.g., 806, 808, 810) for recording event information of the first application that can be used to reproduce audio and video of the first application (e.g., data enabling the game recreate a playthrough of a game from multiple different angles rather than just recording the audio/video generated by the game during the playthrough). For example, the device receives a playback request, and in response to receiving the playback request, the electronic device reproducing the audio and video of the first application based on the event information of the first application.

In some embodiments, the electronic device includes a microphone. The second application provides an option (e.g., affordance 808) for recording audio data and video data of the first application and audio received at the microphone of the device.

In some embodiments, the electronic device includes a microphone and a camera sensor (e.g., 164). The second application provides an option (e.g., 810) for recording audio data and video data of the first application, audio received at the microphone of the device, and video received at the camera sensor (e.g., 164) of the device.

In some embodiments, while recording, the electronic device displays, on the display, a picture-in-picture video (e.g., 816) of the video received at the camera sensor (e.g., 164) of the device. For example, the device records the video received at the camera sensor as a data stream. For example, the video received at the camera sensor captures the user's reactions (e.g., facial expressions) as the user is playing the game. The device also displays the video received at the camera sensor during the recording (e.g., live or near-live) to allow the user to see the camera's field of view (e.g., what is being recorded).

In some embodiments, the electronic device initiates the recording of the at least one data stream of the one or more data streams includes storing each data stream of the at least one data stream separately in memory (e.g., so that the data streams can be combined or not combined at a later time to create a multimedia file).

In some embodiments, initiating the recording of the at least one data stream of the one or more data streams includes storing, to memory, synchronization data to synchronize playback of the at least one data stream (e.g., so that the data streams can be synchronized at a later time such that the audio/video of the application are in sync with any recording audio from the microphone and any recorded video from the camera sensor).

In some embodiments, while recording of the at least one data stream of one or more data streams is in progress, the electronic device displays a visual indicator (e.g., 812) of the second application that indicates the at least one data stream of the one or more data streams is being recorded. For example, the second application includes an indication that "The audio/video of the game and your voice are being recorded" or "Recording game+your audio/video." For another example, a tongue (e.g., 812) of the second application is displayed.

In some embodiments, in response to detecting activation of the stop affordance, the electronic device displays, on the display, a second user interface (e.g., 820) of the second application, wherein the second user interface of the second application provides an option (e.g., 822) for sharing (e.g., by email, by text message, via a social network) the recorded at least one data stream of the one or more data streams.

In some embodiments, in response to detecting activation of the stop affordance (e.g., 814C), the electronic device displays, on the display, a second user interface (e.g., 820) of the second application. The second user interface (e.g., 820) of the second application provides one or more options to edit (e.g., affordance 824) or playback (e.g., 826) the recorded at least one data stream of the one or more data streams. For example, the second user interface (e.g., 820) allows one or more of the following: playback of recorded streams (individually, a subset, or together), trimming of recorded streams, adding voiceover (using a microphone of the device) to recorded streams, adding picture-in-picture video (using a camera sensor of the device) to recorded streams, overlaying indications of measured galvanic skin response data to recorded streams, overlaying indications of measured heart rate data to recorded streams, enabling and disabling of visual or audio indications corresponding to touch information from a touch-sensitive surface captured during the recording, combining portions of different streams during different times of the recording (e.g., turn on video picture-in-picture for a portion of the recording) using recorded individual streams.

In some embodiments, the one or more data streams include a remote data stream received from a second electronic device different from the first electronic device. For example, the electronic device receives heart rate information detected by a paired smartwatch or recorded video information received from a camera sensor of a connected smartphone. For example, heart rate information (e.g., 823) is displayed concurrently with the playback of audio/video of the second application, allowing a user of the device to correlate the user's heart rate with a portion of the game.

In some embodiments, the electronic device stores a temporal marker. The temporal marker is associated with a time of at least one of the one or more data streams and wherein the temporal marker is based on information received from the first application (e.g., the game). The temporal marker allows marking at location of the data stream that is not at the beginning or end of the data stream. For example, the second application creates markers based on information from the second application (e.g., times when achievements were unlocked, laps were completed, levels began or ended, etc.) to allow the user to subsequently quickly access, review, or those marked portions of the recording.

In some embodiments, the electronic device generates a highlight data stream based on the temporal marker and based on a portion (e.g., but not all) of the at least one data stream of the one or more data streams. For example, the electronic device puts together a highlight video. In some embodiments, the portions of the at least one data stream of the one or more data streams included in the highlight video are based on measured galvanic skin response data collected during the recording or heart rate data measured during the recording. In some embodiments, the electronic device determines that a user has opted-in, the electronic device indexes recordings at different points in a game using predefined markers and uploads the videos to one or more servers. The electronic device then enables users to search for uploaded videos that include a requested marker so that users can view the videos. This allows users to quickly find videos that they can watch to see how other players have played a particular level or aspect of a game, such has how players have solved a puzzle in a game.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, the data streams, affordances, and applications of method 700 optionally have one or more of the characteristics of the data streams, affordances, and applications of method 900. For brevity, these details are not repeated.

Figure 10:
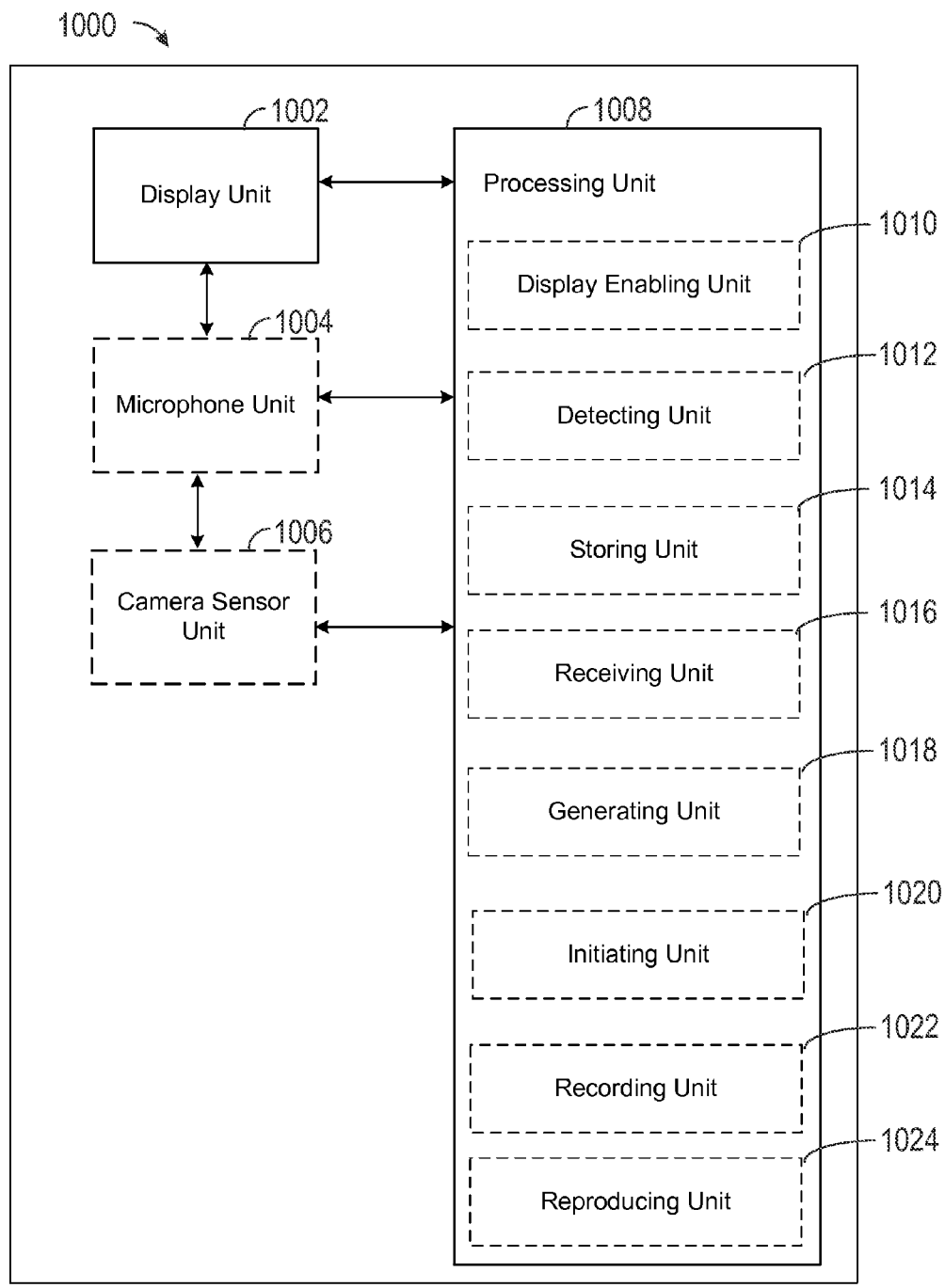
FIGS. 10-11 show exemplary functional block diagrams of an electronic device in accordance with some embodiments.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a display unit 1002 configured to display a graphic user interface, optionally, a microphone unit 1004 configured to receive audio and a camera sensor unit 1006, and a processing unit 1008 coupled to the display unit 1002 and, optionally, the microphone unit 1004 and the camera sensor unit 1006. In some embodiments, the processing unit 1008 includes a display enabling unit 1010, a detecting unit 1012, a storing unit 1014, a receiving unit 1016, a generating unit 1018, an initiating unit 1020, and a recording unit 1022.

The processing unit 1008 is configured to: enable display (e.g., with display enabling unit 1010), on the display unit 1002, a user interface for a first application; detect (e.g., with detecting unit 1012) a record request from the first application to a second application, wherein the record request corresponds to a request for the second application to initiate recording of one or more data streams that include at least one data stream generated by the first application; in response to detecting the record request from the first application, enable display (e.g., with display enabling unit 1010), on the display unit 1002, a user interface for the second application, the user interface for the second application including a confirmation affordance; detect (e.g., with detecting unit 1012) activation of the confirmation affordance; in response to detecting activation of the confirmation affordance, initiate (e.g., with initiating unit 1020) a recording of at least one data stream of the one or more data streams; detect (e.g., with detecting unit 1012) a stop request requesting stoppage of recording of the at least one data stream of the one or more data streams; and in response to detecting the stop request, stop (e.g., with recording unit 1022) recording of the at least one data stream of the one or more data streams.

In some embodiments, the first application initiates the record request in response to a user input. In some embodiments, the record request specifies a request for recording audio data and video data of the first application.

In some embodiments, the record request specifies a request for recording event information of the first application, and the processing unit 1008 is further configured to: receive (e.g., with receiving unit) a playback request; and in response to receiving the playback request, reproduce (e.g., with reproducing unit 1024) the audio and video of the first application based on the event information of the first application.

In some embodiments, the record request specifies a request for recording audio data and video data of the first application and audio data received at the microphone unit 1004.

In some embodiments, the record request specifies a request for recording audio data and video data of the first application, audio received at the microphone unit 1004, and video received at the camera sensor unit 1006.

In some embodiments, the processing unit 1008 is further configured to: while recording, enable display (e.g., with display enabling unit 1010), on the display unit 1002, a picture-in-picture video of the video received at the camera sensor of the device.

In some embodiments, to initiate (e.g., with initiating unit 1020) the recording of the at least one data stream of the one or more data streams, the processing unit 1008 is further configured to store (e.g., with storing unit 1014) each data stream of the at least one data stream separately in memory.

In some embodiments, to initiate (e.g., with initiating unit 1020) the recording of the at least one data stream of the one or more data streams the processing unit is further configured to store (e.g., with storing unit 1014), to memory, synchronization data to synchronize playback of the at least one data stream.

In some embodiments, the user interface for the second application further includes a visual indicator indicating the at least one data stream of the one or more data streams requested to be recorded.

In some embodiments, the processing unit 1008 is further configured to: store (e.g., with storing unit 1014) the recording of the at least one data stream of the one or more data streams into a memory of the device, wherein the first application does not have access to the stored recording of the at least one data stream of the one or more data streams.

In some embodiments, the first application is a game, wherein the processing unit 1008 is further configured to: in response to initiating the recording of the at least one data stream of the one or more data streams, receive (e.g., with receiving unit 1016) by the first application a confirmation that recording has started; and in response to receiving the confirmation that recording has started, initiate (e.g., with initiating unit 1020) a game play of the first application.

In some embodiments, the user interface for the first application includes one or more visual objects that are not recorded as part of the at least one data stream of the one or more data streams, and wherein the at least one data stream of the one or more data steams includes a video stream of the first application.

In some embodiments, the processing unit 1008 is further configured to: in response to detecting the stop request, enable display (e.g., with display enabling unit 1010), on the display unit 1002, a second user interface of the second application, wherein the second user interface of the second application provides an option for sharing the recorded at least one data stream of the one or more data streams.

In some embodiments, the processing unit 1008 is further configured to: in response to detecting the stop request, enable display (e.g., with display enabling unit 1010), on the display unit 1002, a second user interface of the second application, wherein the second user interface of the second application provides one or more options to edit or playback the recorded at least one data stream of the one or more data streams.

In some embodiments, the one or more data streams include a remote data stream received from a second electronic device different from the first electronic device.

In some embodiments, the processing unit 1008 is further configured to: store (e.g., with storing unit 1014) a temporal marker; and wherein the temporal marker is associated with a time of at least one of the one or more data streams and wherein the temporal marker is based on information received from the first application.

In some embodiments, the processing unit 1008 is further configured to: generate (with generating unit 1018) a highlight data stream based on the temporal marker and based on a portion of the at least one data stream of the one or more data streams.

The operations described above with reference to FIG. 7 are, optionally, implemented by components depicted in FIGS. 1A-1B or FIG. 10. For example, displaying operation 702, detecting operation 704, and initiating operation 710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11:
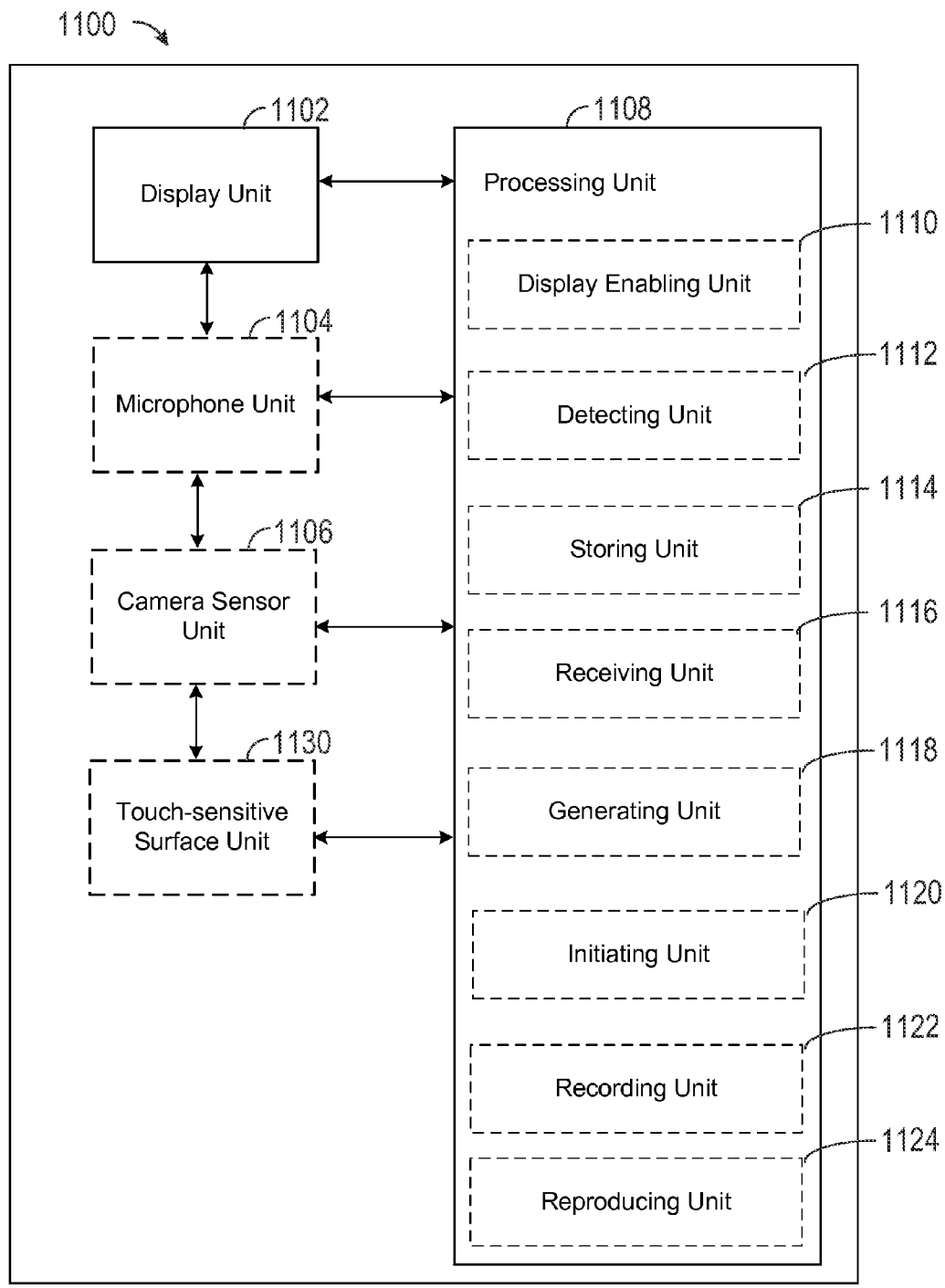

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a graphic user interface, optionally, a microphone unit 1104 configured to receive audio, a camera sensor unit 1106, and a touch-sensitive surface unit 1130, and a processing unit 1108 coupled to the display unit 1102 and, optionally, the microphone unit 1104, the camera sensor unit 1106, and the touch-sensitive surface unit 1130. In some embodiments, the processing unit 1108 includes a display enabling unit 1110, a detecting unit 1112, a storing unit 1114, a receiving unit 1116, a generating unit 1118, an initiating unit 1120, and a recording unit 1122.

The processing unit 1108 is configured to: concurrently enable display (e.g., with display enabling unit 1110) of, on the display unit 1102, a user interface for a first application and a user interface for a second application, wherein at least a portion of the user interface for the first application is overlaid by at least a portion of the user interface for the second application and wherein the user interface for the second application includes a record affordance; detect (e.g., with detecting unit 1112) activation of the record affordance; in response to detecting activation of the record affordance, initiate (e.g., with initiating unit 1120) a recording of at least one data stream of one or more data streams; enable display (e.g., with display enabling unit 1110) of, on the user interface for the second application, a stop affordance; detect (e.g., with detecting unit 1112) activation of the stop affordance; and in response to detecting activation of the stop affordance, stop (e.g., with recording unit 1122) recording of the at least one data stream of the one or more data streams.

In some embodiments, the processing unit 1108 is further configured to: prior to concurrently enabling display of, on the display unit 1102, the user interface for the first application and the user interface for the second application, receive a first swipe input in a first direction at the touch-sensitive surface; in response to receiving the swipe input, enable display (e.g., with display enabling unit 1110) of a control user interface for the second application, wherein the control user interface does not include the record affordance; while displaying the control user interface for the second application, receive (e.g., with receiving unit 1116) a second swipe input in a second direction at the touch-sensitive surface; and wherein the record affordance of the user interface for the second application is displayed as part of the control user interface in response to receiving the second swipe input.

In some embodiments, the processing unit 1108 is further configured to: prior to concurrently enabling display of, on the display unit 1102, the user interface for the first application and the user interface for the second application, receive (e.g., with receiving unit 1116) a request to display controls for controlling functions of the second application; in response to receiving the request to display the control user interface, enable display (e.g., with display enabling unit 1110) of a control user interface that includes one or more controls for controlling functions of the second application; while the control user interface is displayed, enable display (e.g., with display enabling unit 1110) of the record affordance as part of the control user interface.

In some embodiments, the processing unit 1108 is further configured to: in response to detecting activation of the record affordance, update (e.g., with display enabling unit 1110) the display unit 1102 to not include the record affordance.

In some embodiments, the control user interface includes a record affordance that is controlled by the second application and is overlaid on top of the user interface for the first application.

In some embodiments, to update (e.g., with the display enabling unit 1110) the display to not include the record affordance the processing unit is further configured to replace (e.g., with the display enabling unit 1110) the record affordance with the stop affordance.

In some embodiments, the at least the portion of the user interface for the second application is not recorded as part of the at least one data stream of the one or more data streams.

In some embodiments, the second application provides an option for recording audio data and video data of the first application.

In some embodiments, the second application provides an option for recording event information of the first application that can be used to reproduce audio and video of the first application.

In some embodiments, the second application provides an option for recording audio data and video data of the first application and audio received at the microphone unit 1104.

In some embodiments, the second application provides an option for recording audio data and video data of the first application, audio received at the microphone unit 1104, and video received at the camera sensor unit 1106.

In some embodiments, the processing unit 1108 is further configured to: while recording, enable display (e.g., with display enabling unit 1110), on the display unit 1102, a picture-in-picture video of the video received at the camera sensor of the device.

In some embodiments, to initiate (e.g., with initiating unit 1120) the recording of the at least one data stream of the one or more data streams the processing unit is further configured to store (e.g., with storing unit 1114) each data stream of the at least one data stream separately in memory.

In some embodiments, to initiate (e.g., with initiating unit 1120) the recording of the at least one data stream of the one or more data streams the processing unit is further configured to store (e.g., with storing unit 1114), to memory, synchronization data to synchronize playback of the at least one data stream.

In some embodiments, the processing unit 1108 is further configured to: while recording of the at least one data stream of one or more data streams is in progress, enable display (e.g., with display enabling unit 1110) of a visual indicator of the second application that indicates the at least one data stream of the one or more data streams is being recorded.

In some embodiments, the processing unit 1108 is further configured to: in response to detecting activation of the stop affordance, enable display (e.g., with display enabling unit 1110), on the display unit 1102, a second user interface of the second application, wherein the second user interface of the second application provides an option for sharing the recorded at least one data stream of the one or more data streams.

In some embodiments, the processing unit 1108 is further configured to: in response to detecting activation of the stop affordance, enable display (e.g., with display enabling unit 1110) of, on the display unit 1102, a second user interface of the second application, wherein the second user interface of the second application provides one or more options to edit or playback the recorded at least one data stream of the one or more data streams.

In some embodiments, the one or more data streams include a remote data stream received from a second electronic device different from the first electronic device.

In some embodiments, the processing unit 1108 is further configured to: store (e.g., with storing unit 1114) a temporal marker; and wherein the temporal marker is associated with a time of at least one of the one or more data streams and wherein the temporal marker is based on information received from the first application.

In some embodiments, the processing unit 1108 is further configured to: generate (e.g., with generating unit 1118) a highlight data stream based on the temporal marker and based on a portion of the at least one data stream of the one or more data streams.

The operations described above with reference to FIG. 9 are, optionally, implemented by components depicted in FIGS. 1A-1B or FIG. 11. For example, displaying operation 902, detecting operation 904, and initiating operation 906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium comprising one or more programs for execution by one or more processors of an electronic device with a display, the one or more programs including instructions for:
  displaying, on the display, a user interface for a first application;
  detecting a record request from the first application to a second application, wherein the record request corresponds to a request for the second application to record one or more data streams that include at least one data stream generated by the first application, wherein the record request is initiated by the first application;

in response to detecting the record request from the first application, displaying, on the display, a user interface for the second application, the user interface for the second application including a confirmation affordance;

detecting activation of the confirmation affordance;

in response to detecting activation of the confirmation affordance, initiating a recording by the second application of at least one data stream of the one or more data streams generated by the first application;

detecting a stop request requesting stoppage of recording of the at least one data stream of the one or more data streams, wherein the stop request is initiated by the first application; and in response to detecting the stop request, stopping recording of the at least one data stream of the one or more data streams, wherein the second application has privileges to record data streams that the first application is prohibited from recording.

2. The non-transitory computer-readable storage medium of claim 1, wherein the first application initiates the record request in response to a user input.

3. The non-transitory computer-readable storage medium of claim 1, wherein the record request specifies a request for recording audio data and video data of the first application.

4. The non-transitory computer-readable storage medium of claim 1, wherein the record request specifies a request for recording event information of the first application, further including instructions for:

receiving a playback request; and in response to receiving the playback request, reproducing the audio and video of the first application based on the event information of the first application.

5. The non-transitory computer-readable storage medium of claim 1, wherein the electronic device includes a microphone, and wherein the record request specifies a request for recording audio data and video data of the first application and audio data received at the microphone of the device.

6. The non-transitory computer-readable storage medium of claim 1, wherein the electronic device includes a microphone and a camera sensor, and wherein the record request specifies a request for recording audio data and video data of the first application, audio received at the microphone of the device, and video received at the camera sensor of the device.

7. The non-transitory computer-readable storage medium of claim 6, further including instructions for:

while recording, displaying, on the display, a picture-in-picture video of the video received at the camera sensor of the device.

8. The non-transitory computer-readable storage medium of claim 1, wherein initiating the recording of the at least one data stream of the one or more data streams includes storing each data stream of the at least one data stream separately in memory.

9. The non-transitory computer-readable storage medium of claim 1, wherein initiating the recording of the at least one data stream of the one or more data streams includes storing, to memory, synchronization data to synchronize playback of the at least one data stream.

10. The non-transitory computer-readable storage medium of claim 1, wherein the user interface for the second application further includes a visual indicator indicating the at least one data stream of the one or more data streams requested to be recorded.

11. The non-transitory computer-readable storage medium of claim 1, further including instructions for:

storing the recording of the at least one data stream of the one or more data streams into a memory of the device, wherein the first application does not have access to the stored recording of the at least one data stream of the one or more data streams.

12. The non-transitory computer-readable storage medium of claim 1, wherein the first application is a game, and further including instructions for:

in response to initiating the recording of the at least one data stream of the one or more data streams, receiving by the first application a confirmation that recording has started; and in response to receiving the confirmation that recording has started, initiating a game play of the first application.

13. The non-transitory computer-readable storage medium of claim 1, wherein the user interface for the first application includes one or more visual objects that are not recorded as part of the at least one data stream of the one or more data streams, and wherein the at least one data stream of the one or more data streams includes a video stream of the first application.

14. The non-transitory computer-readable storage medium of claim 1, further including instructions for:

in response to detecting the stop request, displaying, on the display, a second user interface of the second application, wherein the second user interface of the second application provides an option for sharing the recorded at least one data stream of the one or more data streams.

15. The non-transitory computer-readable storage medium of claim 1, further including instructions for:

in response to detecting the stop request, displaying, on the display, a second user interface of the second application, wherein the second user interface of the second application provides one or more options to edit or playback the recorded at least one data stream of the one or more data streams.

16. The non-transitory computer-readable storage medium of claim 1, wherein the one or more data streams include a remote data stream received from a second electronic device different from the first electronic device.

17. The non-transitory computer-readable storage medium of claim 1, further including instructions for:

storing a temporal marker; and wherein the temporal marker is associated with a time of at least one of the one or more data streams and wherein the temporal marker is based on information received from the first application.

18. The non-transitory computer-readable storage medium of claim 17, further including instructions for:

generating a highlight data stream based on the temporal marker and based on a portion of the at least one data stream of the one or more data streams.

19. A method, comprising:

at an electronic device including a display:

displaying, on the display, a user interface for a first application;

detecting a record request from the first application to a second application, wherein the record request corresponds to a request for the second application to record one or more data streams that include at least one data stream generated by the first application, wherein the record request is initiated by the first application;

in response to detecting the record request from the first application, displaying, on the display, a user interface for the second application, the user interface for the second application including a confirmation affordance;

detecting activation of the confirmation affordance;

in response to detecting activation of the confirmation affordance, initiating a recording by the second application of at least one data stream of the one or more data streams generated by the first application;

detecting a stop request requesting stoppage of recording of the at least one data stream of the one or more data streams, wherein the stop request is initiated by the first application; and in response to detecting the stop request, stopping recording of the at least one data stream of the one or more data streams, wherein the second application has privileges to record data streams that the first application is prohibited from recording.

20. An electronic device comprising:

a display;

one or more processors; and memory storing one or more programs, the one or more programs including instructions which, when executed by the one or more processors, cause the electronic device to:

display, on the display, a user interface for a first application;

detect a record request from the first application to a second application, wherein the record request corresponds to a request for the second application to record one or more data streams that include at least one data stream generated by the first application, wherein the record request is initiated by the first application;

in response to detecting the record request from the first application, display, on the display, a user interface for the second application, the user interface for the second application including a confirmation affordance;

detect activation of the confirmation affordance;

in response to detecting activation of the confirmation affordance, initiate a recording by the second application of at least one data stream of the one or more data streams generated by the first application;

detect a stop request requesting stoppage of recording of the at least one data stream of the one or more data streams, wherein the stop request is initiated by the first application; and in response to detecting the stop request, stop recording of the at least one data stream of the one or more data streams, wherein the second application has privileges to record data streams that the first application is prohibited from recording.

21. The non-transitory computer-readable storage medium of claim 1, wherein the second application is an operating system of the electronic device.

22. The method of claim 19, wherein the first application initiates the record request in response to a user input.

23. The method of claim 19, wherein the record request specifies a request for recording audio data and video data of the first application.

24. The method of claim 19, wherein the record request specifies a request for recording event information of the first application, the method further comprising:

receiving a playback request; and in response to receiving the playback request, reproducing the audio and video of the first application based on the event information of the first application.

25. The method of claim 19, wherein the electronic device includes a microphone, and wherein the record request specifies a request for recording audio data and video data of the first application and audio data received at the microphone of the device.

26. The method of claim 19, wherein the electronic device includes a microphone and a camera sensor, and wherein the record request specifies a request for recording audio data and video data of the first application, audio received at the microphone of the device, and video received at the camera sensor of the device.

27. The method of claim 26, the method further comprising:

while recording, displaying, on the display, a picture-in-picture video of the video received at the camera sensor of the device.

28. The method of claim 19, wherein initiating the recording of the at least one data stream of the one or more data streams includes storing each data stream of the at least one data stream separately in memory.

29. The method of claim 19, wherein initiating the recording of the at least one data stream of the one or more data streams includes storing, to memory, synchronization data to synchronize playback of the at least one data stream.

30. The method of claim 19, wherein the user interface for the second application further includes a visual indicator indicating the at least one data stream of the one or more data streams requested to be recorded.

31. The method of claim 19, the method further comprising:

storing the recording of the at least one data stream of the one or more data streams into a memory of the device, wherein the first application does not have access to the stored recording of the at least one data stream of the one or more data streams.

32. The method of claim 19, wherein the first application is a game, and the method further comprises:

in response to initiating the recording of the at least one data stream of the one or more data streams, receiving by the first application a confirmation that recording has started; and in response to receiving the confirmation that recording has started, initiating a game play of the first application.

33. The method of claim 19, wherein the user interface for the first application includes one or more visual objects that are not recorded as part of the at least one data stream of the one or more data streams, and wherein the at least one data stream of the one or more data streams includes a video stream of the first application.

34. The method of claim 19, the method further comprising:

in response to detecting the stop request, displaying, on the display, a second user interface of the second application, wherein the second user interface of the second application provides an option for sharing the recorded at least one data stream of the one or more data streams.

35. The method of claim 19, the method further comprising:

in response to detecting the stop request, displaying, on the display, a second user interface of the second application, wherein the second user interface of the second application provides one or more options to edit or playback the recorded at least one data stream of the one or more data streams.

36. The method of claim 19, wherein the one or more data streams include a remote data stream received from a second electronic device different from the first electronic device.

37. The method of claim 19, the method further comprising:
storing a temporal marker; and
wherein the temporal marker is associated with a time of at least one of the one or more data streams and wherein the temporal marker is based on information received from the first application.

38. The method of claim 37, the method further comprising:
generating a highlight data stream based on the temporal marker and based on a portion of the at least one data stream of the one or more data streams.

39. The method of claim 19, wherein the second application is an operating system of the electronic device.

40. The electronic device of claim 20, wherein the first application initiates the record request in response to a user input.

41. The electronic device of claim 20, wherein the record request specifies a request for recording audio data and video data of the first application.

42. The electronic device of claim 20, wherein the record request specifies a request for recording event information of the first application, further including instructions that cause the electronic device to:
receive a playback request; and
in response to receiving the playback request, reproduce the audio and video of the first application based on the event information of the first application.

43. The electronic device of claim 20, wherein the electronic device includes a microphone, and wherein the record request specifies a request for recording audio data and video data of the first application and audio data received at the microphone of the device.

44. The electronic device of claim 20, wherein the electronic device includes a microphone and a camera sensor, and wherein the record request specifies a request for recording audio data and video data of the first application, audio received at the microphone of the device, and video received at the camera sensor of the device.

45. The electronic device of claim 44, further including instructions that cause the electronic device to:
while recording, display, on the display, a picture-in-picture video of the video received at the camera sensor of the device.

46. The electronic device of claim 20, wherein initiating the recording of the at least one data stream of the one or more data streams includes storing each data stream of the at least one data stream separately in memory.

47. The electronic device of claim 20, wherein initiating the recording of the at least one data stream of the one or more data streams includes storing, to memory, synchronization data to synchronize playback of the at least one data stream.

48. The electronic device of claim 20, wherein the user interface for the second application further includes a visual indicator indicating the at least one data stream of the one or more data streams requested to be recorded.

49. The electronic device of claim 20, further including instructions that cause the electronic device to:
store the recording of the at least one data stream of the one or more data streams into a memory of the device, wherein the first application does not have access to the stored recording of the at least one data stream of the one or more data streams.

50. The electronic device of claim 20, wherein the first application is a game, and further including instructions that cause the electronic device to:
in response to initiating the recording of the at least one data stream of the one or more data streams, receive by the first application a confirmation that recording has started; and
in response to receiving the confirmation that recording has started, initiate a game play of the first application.

51. The electronic device of claim 20, wherein the user interface for the first application includes one or more visual objects that are not recorded as part of the at least one data stream of the one or more data streams, and wherein the at least one data stream of the one or more data streams includes a video stream of the first application.

52. The electronic device of claim 20, further including instructions that cause the electronic device to:
in response to detecting the stop request, display, on the display, a second user interface of the second application, wherein the second user interface of the second application provides an option for sharing the recorded at least one data stream of the one or more data streams.

53. The electronic device of claim 20, further including instructions that cause the electronic device to:
in response to detecting the stop request, display, on the display, a second user interface of the second application, wherein the second user interface of the second application provides one or more options to edit or playback the recorded at least one data stream of the one or more data streams.

54. The electronic device of claim 20, wherein the one or more data streams include a remote data stream received from a second electronic device different from the first electronic device.

55. The electronic device of claim 20, further including instructions that cause the electronic device to:
store a temporal marker; and
wherein the temporal marker is associated with a time of at least one of the one or more data streams and wherein the temporal marker is based on information received from the first application.

56. The electronic device of claim 55, further including instructions that cause the electronic device to:
generate a highlight data stream based on the temporal marker and based on a portion of the at least one data stream of the one or more data streams.

57. The electronic device of claim 20, wherein the second application is an operating system of the electronic device.

* * * * *